(12) United States Patent
Fukumoto et al.

(10) Patent No.: US 7,551,893 B2
(45) Date of Patent: Jun. 23, 2009

(54) COMMUNICATIONS UNIT, COMMUNICATIONS FACILITY, MANAGEMENT DEVICE, COMMUNICATION SYSTEM, AND ELECTRIC FIELD COMMUNICATION DEVICE

(75) Inventors: Masaaki Fukumoto, Yokohama (JP); Toshiaki Sugimura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 794 days.

(21) Appl. No.: 10/521,601

(22) PCT Filed: Jul. 17, 2003

(86) PCT No.: PCT/JP03/09082

§ 371 (c)(1),
(2), (4) Date: Jul. 29, 2005

(87) PCT Pub. No.: WO2004/010651

PCT Pub. Date: Jan. 29, 2004

(65) Prior Publication Data

US 2006/0077172 A1    Apr. 13, 2006

(30) Foreign Application Priority Data

Jul. 18, 2002    (JP) .............................. 2002-210051

(51) Int. Cl.
*H04B 7/00* (2006.01)
(52) U.S. Cl. .................. 455/41.2; 455/41.1; 455/90.3; 455/446; 455/448; 455/449; 455/575.1; 455/575.8; 370/254; 370/257; 370/400; 340/5.61; 340/5.64

(58) Field of Classification Search ......... 455/436–445, 455/41.1–2, 507–520, 575.1, 575.8, 90.3, 455/446–449; 370/254–258, 400–410; 340/5.61–5.67; 345/156
See application file for complete search history.

(56) References Cited

U.S. PATENT DOCUMENTS

| 5,724,346 A | * | 3/1998 | Kobayashi et al. .......... 370/329 |
| 5,907,544 A | * | 5/1999 | Rypinski .................... 370/337 |
| 6,008,923 A | * | 12/1999 | Samdahl et al. ............. 398/127 |
| 6,223,018 B1 | | 4/2001 | Fukumoto et al. |
| 6,249,671 B1 | * | 6/2001 | Tucker et al. ............... 455/90.3 |
| 6,637,161 B1 | * | 10/2003 | Buchalter et al. ........... 52/126.6 |

(Continued)

FOREIGN PATENT DOCUMENTS

JP    S62-039927    2/1987

(Continued)

OTHER PUBLICATIONS

Japanese Office Action dated Feb. 6, 2007.

(Continued)

*Primary Examiner*—Tuan A Tran
(74) *Attorney, Agent, or Firm*—Brinks Hofer Gilson & Lione

(57) ABSTRACT

Communications control apparatus CCUn involved in unitary tile carpet CPn has functions of performing communication with communications terminal TRX and wired communication with other communication control apparatus CCUn in adjoining tile carpet CPn. Each tile carpet CPn is laid out on the floor and connected to adjoining tile carpet CPn via connector CNn. Thus, a plurality of tile carpet CPn forms local area network LAN. Communication terminal TRX functions as a terminal of LAN.

19 Claims, 25 Drawing Sheets

U.S. PATENT DOCUMENTS

| | | | |
|---|---|---|---|
| 6,988,989 B2 * | 1/2006 | Weiner et al. | 600/300 |
| 7,260,835 B2 * | 8/2007 | Bajikar | 726/4 |

FOREIGN PATENT DOCUMENTS

| | | |
|---|---|---|
| JP | H04-123531 | 4/1992 |
| JP | H06-253359 A | 9/1994 |
| JP | H10-229357 | 8/1998 |
| JP | H11-154963 A | 6/1999 |
| JP | H11-196110 | 7/1999 |
| JP | H11-284541 A | 10/1999 |
| JP | 2000-123285 | 4/2000 |
| JP | 2001-077735 | 3/2001 |
| JP | 2001-298425 A | 10/2001 |

OTHER PUBLICATIONS

Korean Office Action, KR Patent App. No. 10-2005-7000963, Sep. 21, 2006.

Japanese Office Action, JP Pat. App. No. 2004-522746, Sep. 22, 2006.

* cited by examiner

FIG. 10

106a: CONTROL INFORMATION STORAGE TABLE

| ID | AE1059369CE3 | |
|---|---|---|
| SIZE | 200 × 200 [cm] | |
| FORM | SQUARE | |
| NUMBER OF CONNECTION | 4 | |
| CONNECTION LOCATION | 0°, 90°, 180°, 270° | |
| DESTINATION ID | WI1 (CN1: 0°) | AE3049785CD1 |
| | WI2 (CN2: 90°) | AE7059988BE3 |
| | WI3 (CN3: 180°) | AB2195741AA1 |
| | WI4 (CN4: 270°) | AE1050001CE2 |
| LOCATION INFORMATION | LATITUDE, LONGITUDE, ALTITUDE | |
| | ADDRESS | |
| | BUILDING | |
| | FLOOR / ROOM | |

COMMUNICATIONS UNIT, COMMUNICATIONS FACILITY, MANAGEMENT DEVICE, COMMUNICATION SYSTEM, AND ELECTRIC FIELD COMMUNICATION DEVICE

BACKGROUND OF THE INVENTION

1. Technical Field

The present invention relates to a communication equipment and technology for performing communications using induction of electric fields in the dielectric such as the human body.

2. Related Art

In recent years In recent years, office LANS which is a network of, for example, computers for use by each employee, printers and the like that have been installed in offices. A user can perform tasks like transmitting/receiving e-mail among employees through the LAN and printing documents based on data created on their computers. Moreover, if an office LAN is connected to the Internet, it is possible to access the Internet from the computers of employees.

With an office LAN, it is necessary to connect each office computer to a printer, hub, router and the like using communications cables. To install an office LAN using wires in this way, there are the problems of harming the aesthetics of office with communications cables complicating the installation of the connections. As well, one can consider using a wireless LAN for resolving such problems. However, even in the case of using a wireless LAN, these complications of construction do not disappear. This is because one must install LAN devices such as, for example, access points.

In recent years, offices without networked computers and printers are very rare. Accordingly, if prepared with pre-installed equipment for network use in a floor or the like provided for office use, there is already the possibility of simplification of the construction needed to install an office LAN.

SUMMARY OF THE INVENTION

The present invention provides a solution for the above problem. The present invention provides a communications unit, client communications apparatus, a management apparatus, a communications system, and an electric field communications apparatus capable of being easily installed.

In order to solve the above problems, this invention provides a communications unit comprising: a first communications means that controls communications between the communications unit and one or a plurality of other communications units connected to the communications unit; and a second communications means that controls communications between the communications unit and a client communications apparatus, wherein the communication unit is installed in a mapped unitary flooring of a construction or in a mapped unitary flooring, and the communication units and the other one or a plurality of communication units installed in the mapped unitary flooring are interconnected to form a communication network that serves the client communications apparatus.

Additionally, this invention also provides a communications unit comprising: a first communications means that controls communications between the communications unit and one or a plurality of other communications units connected to the communications unit; and a second communications means that controls communications between the communications unit and a client communications apparatus, wherein the communication unit is installed in a unitary partition panel of a construction, and the communication units and the other one or a plurality of communication units installed in the unitary partition panel are interconnected to form a communications network that serves the client communications apparatus.

As well, this invention provides communications equipment that functions as a communications network formed by a plurality of the communications units in which the client communications apparatus functions as a terminal.

According to this invention, by laying out a floor covering with communications units installed, or by using partition panels, it is possible to arrange a communications network.

In a preferred embodiment, the client communications apparatus comprises a transmitter main electrode provided in a location so as to readily exert an electric effect on a dielectric; and a modulator that modulates an electric potential to the transmitter main electrode in response to an electric signal corresponding to transmitted data; the client communications apparatus provides to the dielectric an electric field corresponding to the modulated electric potential; the communications unit further comprises a receiver main electrode provided in a location so as to readily exert an electric effect on a dielectric; and the second communications means comprises a measuring part that measures an electric state of the receiver main electrode exerted by the electric field; and a demodulator that acquires the electric signal from the measuring part and acquires the transmitted data by demodulating the electric signal.

In another preferred embodiment, the client communications apparatus comprises: a transmitter main electrode provided in a location that readily provides an electric effects to a dielectric; a transmitter return electrode; and a modulator that changes the voltage difference between the transmitter main electrode and the transmitter return electrode in response to an electric signal corresponding to the transmitted data, the client communications apparatus provides to the dielectric an electric field corresponding to changes in the voltage generated by the modulator; the communications unit further comprises: a receiver main electrode provided in a location that easily provides electric effect to a dielectric, the location being in the surface of the communications unit; and a receiver return electrode connected to the communications unit to establish a return path with the transmitter feed back electrode; and the second communications means comprises: measuring part that measures the electric state generated between the receiver main electrode and the receiver return electrode by the electric field provided to the dielectric; and a demodulator that acquires the electric signal based on the measurement result from the measuring part, and acquires data transmitted from the client communications apparatus by demodulating the electric signal.

According to this embodiment, the communications unit and the client communications apparatus become capable of performing communications by inducing an electric field through a dielectric.

In yet another preferred embodiment, the receiver main electrodes are severally provided on the surface of the communications unit; the measuring part measures the strength of the electric field at each of the receiver main electrodes; and the communications unit further comprises: storage means that store location information indicating the location where the communications unit is disposed; and location detection means that acquires locations of the client communications apparatus, based on the measurement result by the measuring part and information stored in the storage means.

In yet another preferred embodiment, the client communications apparatus comprises two transmitter main electrodes on its lower surface; the client communications apparatus can generate an electric field from one of the two transmitter main electrodes; each of the receiver main electrodes are provided on the surface of the communications unit; the measuring part measures at each the receiver main electrode the electric field generated from the transmitter main electrode; the location detection means acquires the location of each of the transmitter main electrodes, based on the measurement result by the measurement part and information stored in the storage means.

According to the embodiment, the communications unit and the client communications apparatus can detect the location and direction of a communications apparatus performing communications.

In yet another preferred embodiment, a pair of first electrodes that are located in an interval, and a directional coupling element that connects the pair of first electrodes, the pair of first electrodes being provided on footwear on one foot or the other worn by a person who is on the communications unit; a plurality of second electrodes provided on the surface of the communications unit; storage means that store location information that indicates the locations of the plurality of second electrodes on the surface of the communications unit; measuring means that consecutively select a pair of second electrodes from among the plurality of second electrodes, measures an electric potential induced at one of the selected pair of with the other of the pair of second electrodes being applied the change in electric potential; and direction detection means that acquires the direction of the person based on information recorded in the storage means and the measurement result by the measurement means.

As well, on the lower surface of a product placed on the communications unit, there may be the above pair of second electrodes and a directional coupling element.

In yet another preferred embodiment, a pair of first electrodes that are located in an interval, and a directional coupling element that connects the pair of first electrodes, the pair of first electrodes being provided on footwear on one foot or the other worn by a person who is on the communications unit; a plurality of second electrodes provided on the surface of the communications unit; storage means that store location information that indicates the location of the communications unit and location information that indicates the locations of the plurality of second electrodes on the surface of the communications unit; measuring means that consecutively select a pair of second electrodes from among the plurality of second electrodes, measures an electric potential induced at one of the selected pair of with the other of the pair of second electrodes being applied the change in electric potential; and direction detection means that acquires the direction of the person based on information recorded in the storage means and the measurement result by the measurement means.

As well, on the lower surface of a product placed on the communications unit, there may be the above pair of second electrodes and a directional coupling element.

According to the embodiment, the communications unit can detect the location and direction of a person or a product located on the communications unit.

In yet another preferred embodiment, the client communications apparatus comprises: a first electrode and a second electrode formed on a surface in contact with a face of the communications unit; a rectifier circuit that converts to DC voltage the AC voltage induced between the first electrode and the second electrode; and a battery that is charged by the DC voltage acquired by the rectifier circuit, and the communications unit further comprises: a third electrode formed on a surface of the communications unit, the surface contacting the client communications apparatus; a fourth electrode connected to the communications unit for establishing a return path; and an oscillator that applies, between the third electrode and the fourth electrode, an AC voltage for performing charging of the communications apparatus.

In yet another preferred embodiment, the client communications apparatus comprises: a secondary coil provided on a surface in contact with a face of the communications unit; a rectifier circuit that converts to DC voltage the AC voltage induced at the secondary coil; and a battery that is charged by the DC voltage acquired by the rectifier circuit, and the communications unit further comprises: a primary coil provided on a surface in contact with the client communications apparatus; and an oscillator that applies to the primary coil an AC voltage for charging the client communications apparatus.

According to the present embodiment, it becomes possible to perform charging of the communications apparatus using the communications unit.

Additionally, this invention also provides a management apparatus for managing communications network formed by a plurality of communications unit of claim 1, the management apparatus comprising: detection means that detect the network topology of the communications network; and notification means that notify the user of the management apparatus of information indicating the connection status of the plurality of communications units, based on the network topology detected by the detection means.

According to this invention, the management apparatus can notify the user of changes in the connection state of each communications unit.

The present invention also provides a management apparatus for managing communications network formed by a plurality of communications unit of claim 1, the management apparatus comprising: storage means that store reference point information showing a location of reference point for computing the location of the plurality of communications unit; detection means that detect the network topology of the communications network; acquisition means that acquire information indicating the size, the form, and connection locations of the plurality of communications units; location detection means that acquire the locations of at least one of the plurality of communications units, based on reference point information stored in the storage means, the network topology detected by the detection means, and information acquired by the acquisition means; and transmission means that transmit to the communications unit location information acquired by the location detection means.

According to this invention, the management apparatus can acquire the location of plurality of communications unit forming the communications network, and transmit to the communications unit the location information.

The present invention also provides an electric field communication apparatus communicating to a base station, the base station performing communication with the electric field communication apparatus, wherein: the base station comprises: a transmitter main electrode provided in a location so as to readily exert an electric effect on a dielectric; a signal generator that generates an electric signal corresponding to data to be transmitted; and a modulator that modulates an electric potential to be provided to the transmitter main electrode, the modulator changing the electric potential at a regular interval in response to a notification information for notifying the existence of the base station; the base station provides to the dielectric an electric field corresponding to the electric potential generated by the modulator; the electric field communication apparatus comprises: a receiver main electrode provided in a location so as to readily receive an electric effect from the dielectric; a measuring part that measures electric status generates by the electric field provided to the dielectric; a demodulator that acquires electric signal based on the measurement result of the measuring part, and acquires transmitted data from the electric signal by demodulating the electric signal; and notifying means that notifies a user of the electric field communications apparatus in a case that the notification information is continuously provided more than a predetermined duration.

According to this invention, electric field communications apparatus notifies the user that it is possible to communication with a base station, in a case that the notification information is continuously provided more than a predetermined duration.

According to the present invention described above, it is possible to provide communications equipment for network use that can be easily installed. As well, it is possible to increase the efficiency of the electric field communications apparatus used as a terminal, together with making it possible to provide communications equipment for network use that performs communication with a terminal by conducting electric fields in a dielectric.

BRIEF DESCRIPTION OF THE DRAWINGS

FIG. 10 shows the data composition of control information storage table 106a recorded in nonvolatile memory 106, for communications control apparatus CCU according to the first embodiment.

DESCRIPTION OF THE PREFERRED EMBODIMENTS

Figure 1:
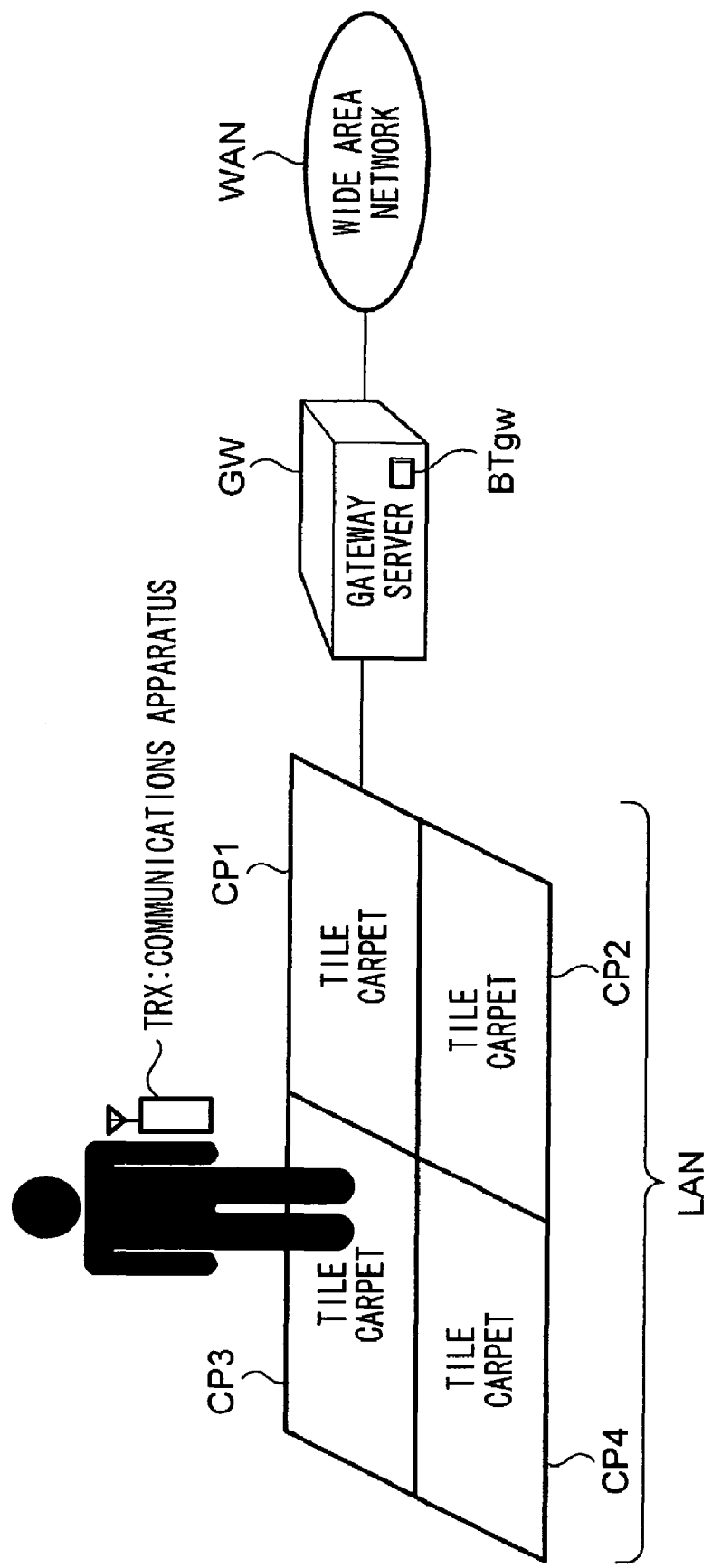
FIG. 1 shows an example of a configuration of a communication system according to the first embodiment of the present invention.

Preferred embodiments of the present invention are explained with reference to the figures. In the common parts through the figures, the same reference numerals and symbols are used.

A. First Embodiment

<1. General Configuration of the Communication System>

FIG. 1 shows a configuration of a communications system according to the first embodiment. The communication system as shown in FIG. 1 has portable communications apparatus TRX, a plurality of tile carpets CP1-CP4 capable of communicating with the communications apparatus TRX, a gateway server GW, and a wide-area network WAN such as the Internet.

Moreover, to start with, this communication system is capable of accommodating a plurality of communications apparatus TRX; however, to avoid complicating the diagram, FIG. 1 shows only one communications apparatus TRX. As well, for the same reason, only four tile carpets CP1-CP4 and one gateway server GW are shown in FIG. 1. As well, hereafter, for this specification, tile carpet CP1-CP4 are represented as tile carpet CPn except noted.

Communications apparatus TRX performs wired or wireless communications using communications control apparatus involved in tile carpets CPn. Hereafter, in the present embodiment, the explanation will be given for the case of communications apparatus TRX performing wireless communications with communications control apparatus involved in tile carpets CPn.

Each Tile carpet CPn is unitary flooring involving the communications control apparatus. Tile carpets CPn are laid out on the floor inside structures that accommodate human beings, such as a buildings, homes, ships, aircraft, and the like. As well, each tile carpet CPn laid out in this manner is electrically connected to adjoining tile carpets CPn, and forms a local area network LAN. In the LAN, communications apparatus TRX functions as a terminal device.

Gateway server GW mutually converts data of different communications protocols, such as communications protocols for the local area network LAN and for the wide area network WAN, and relays the transfer of data between the local area network LAN and the wide area network WAN. As well, this gateway server GW is provided with an operation button BTgw for instructing to update the network topology of the local area network LAN.

<2. Configuration of Tile Carpet CPn>

Figure 2:
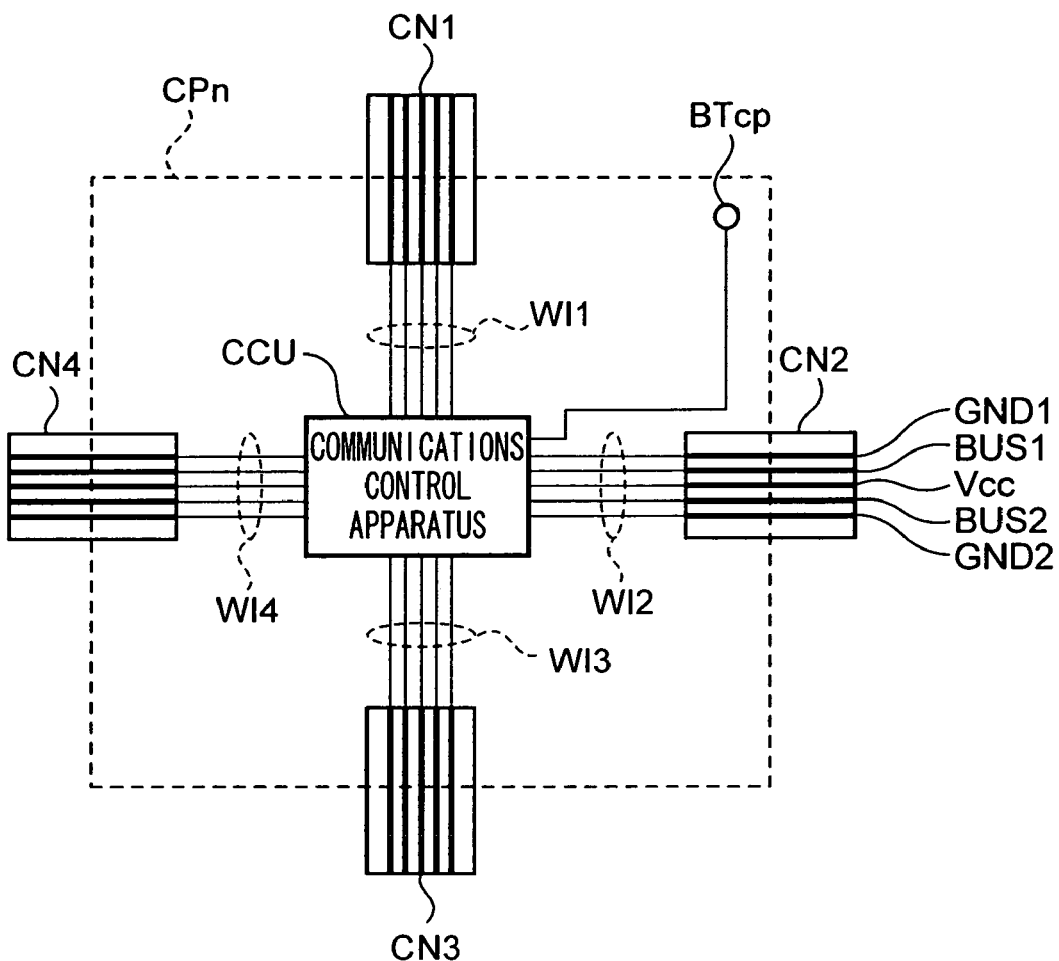
FIG. 2 shows an internal composition of a tile carpet CPn according to the first embodiment.

Next, the internal structure of a tile carpet CPn is shown in FIG. 2. As shown in FIG. 2, the tile carpet CPn has the form of a square. Tile carpet CPn includes communications control apparatus CCU, internal wiring W11-W14 extending in four directions from this communications controller apparatus CCU, and operation button BTcp connected to communications controller apparatus CCU.

Moreover, operation button BTcp has an operation button part that is exposed on the surface of tile carpet CPn. As well, this tile carpet CPn has connectors CN1-CN4 used for making electric connections to another tile carpets CPn adjoining the tile carpet CPn on four sides. Hereafter, for this specification, internal wiring W11-W14 are represented as Win, and connectors CN1-CN4 are represented CNn, except noted.

Internal wiring Win has electric supply lines (GND1, GND2, Vcc) for applying driving voltage to communications apparatus CCU, and bidirectional data buses (BUS1, BUS2) for transmission of data. The electric supply lines and data bus are made of conductive parts whose surfaces are covered with insulating material. Moreover, one may use optical fiber as the data bus, in the case of performing optical communications for the transmission of data.

Figure 3:
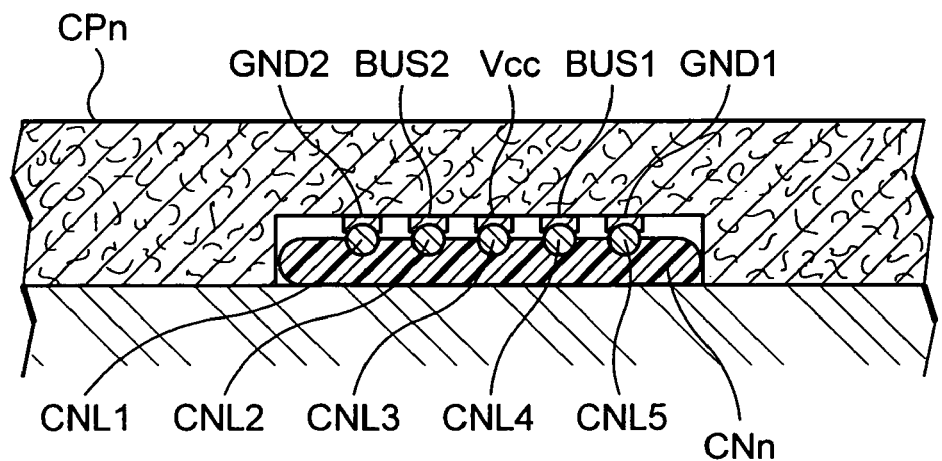
FIG. 3 is a cross sectional view of the contacting surfaces of tile carpet CPn and connectors CNn according to the first embodiment.

As well, the connector CNn as shown in FIG. 2 is installed in the central part of the lower surface of tile carpet CPn having a square shape. FIG. 3 is a cross sectional view showing the contact surfaces of a tile carpet CPn and connectors CNn. Concavities for inserting connectors CNn have been provided on the lower surface of tile carpet CPn as shown in FIG. 3. As well, in these concave lower surfaces, power supply lines and data buses are exposed. For the exposed portions of the power supply lines and data buses exposed in this concavity, the insulating material covering their surfaces has been peeled away.

Five conducting lines CNL1-CNL5 made of conductive parts have been provided on the opposite surface of connectors CNn. By inserting these connectors CNn in the concavities of tile carpet CPn, each conductive line CNL1-CNL5 of connector CNn contacts the electric power lines and the data buses as shown in FIG. 3, and they conduct. As well, the remaining half of connector CNN projecting from the outer side of tile carpet CPn is inserted in the cavity of the adjoining tile carpet CPn. Thus, the power lines and data buses are connected to the adjoining tile carpets CPn. As a result, the drive voltage from a power source (not shown) is applied to the communications control apparatus CCU of each tile carpet CPn. As well, it becomes possible to perform transfer of data among each communications control apparatus CCU connected by the data buses.

Moreover, as for the arrangement of each line (GND1, BUS1, Vcc, BUS2, GND2) in internal wiring Win and connectors CNn, it is desirable that the lines GND 1 and GND 2, and lines BUS 1 and BUS 2 are symmetric with respect to line Vcc. This is because it need not take into account direction when laying out tile carpet CPn. As well, connector CNn is not restricted to a detachable one. For example, connector CNn may be attached to edges of tile carpet CPn beforehand.

Figure 4:
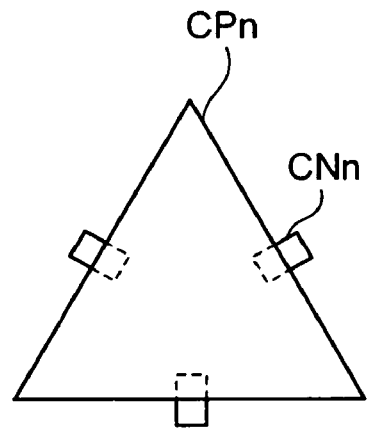
FIG. 4 shows an example of tile carpet CPn having another form, and the installation location of connectors CNn according to the first embodiment.
Figure 5:
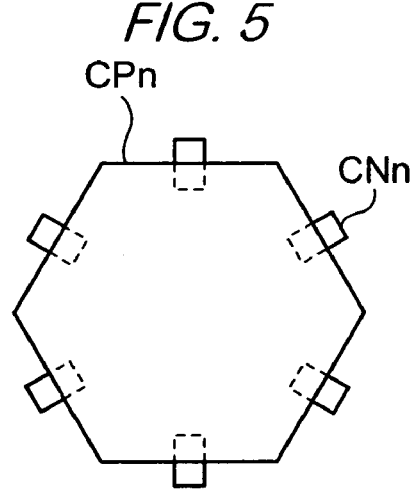
FIG. 5 shows another example of a tile carpet CPn having another form, and the installation locations of connectors CNn according to the first embodiment.
Figure 6:
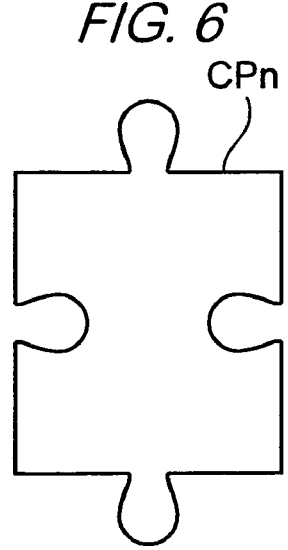
FIG. 6 shows an example of a tile carpet CPn having another form according to the first embodiment.
Figure 7:
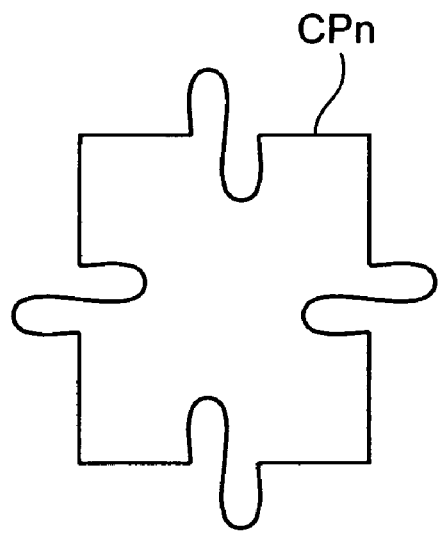
FIG. 7 shows another example of a tile carpet CPn having another form according to the first embodiment.

As well, the form of tile carpet CPn is not limited to square forms. For example, the tile carpet CPn may take a triangular form as shown in FIG. 4, and may be installed so that the connector CNn is on the lower surface of the central part of each neighborhood. As well, the tile carpet CP may take a hexagonal form as shown in FIG. 5, and may be installed so that the connector CNn is on the lower surface of the central part of each neighborhood. Furthermore, tile carpet CPn may assume a form that has a constriction of the kind found in puzzle pieces as shown in FIG. 6 and FIG. 7.

Figure 8:
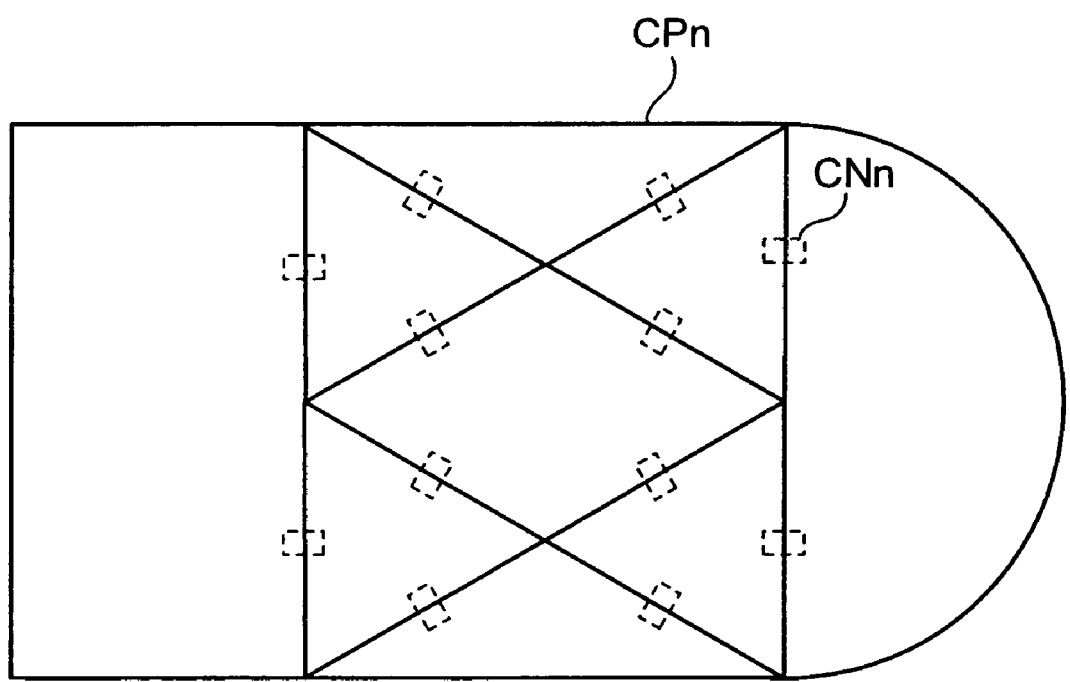
FIG. 8 shows an example of several tile carpets CPn of varying forms laid out, according to the first embodiment.

As well, in the case of laying out a plurality of tile carpets CPn, with the method of using tile carpets CPn having a single form, it is possible to increase the efficiency of the construction work. However, in response to the form of the layout location of tile carpets CPn, it is also possible, for example, to lay out a plurality of tile carpets having varying forms as shown in FIG. 8. In the pattern shown in FIG. 8, a plurality of tile carpets CPn are laid out in an elongated form, a triangular form, and a semicircular form.

<3. Configuration of Communications Control Apparatus CCU>

Figure 9:
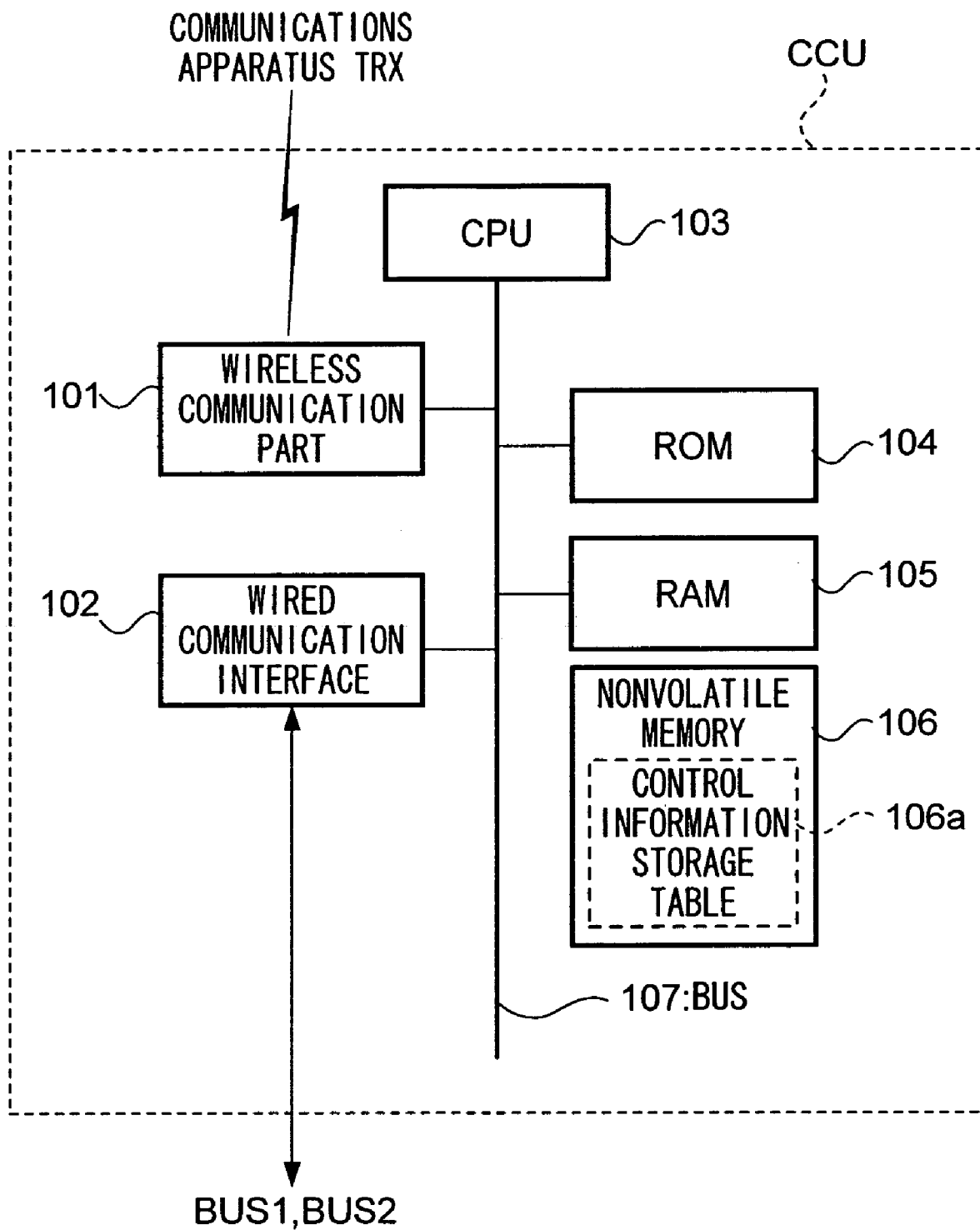
FIG. 9 is a block diagram showing a hardware configuration of communications control apparatus CCU involved in a tile carpet CPn according to the first embodiment.

Next, a hardware configuration of communications controller apparatus CCU involved in tile carpet CPn is shown in FIG. 9. As shown in FIG. 9, the communications controller apparatus CCU has a wireless communications part 101, a wireless communications interface 102, a CPU 103, a ROM 104, a RAM 105, and a nonvolatile memory 106, and each part is connected by a bus 107.

Wireless communications part 101 controls wireless communications with communication apparatus TRX. As well, wireless communications interface 102 controls wireless communications with communications controller apparatus CCU in adjoining tile carpets CPn, connected through data buses BUS1 and BUS2. Moreover, wireless communications interface 102 has functions such as switching hubs and routers for existing networks such as Ethernet. Therefore, when transferring data within the local area network LAN, wireless communications interface 102 can prevent data collisions and data loops.

ROM 104 stores programs and data for controlling the various parts of communications controller apparatus CCU. As well, RAM 105 is used as a work area for CPU 103. CPU 103 controls the various parts of communications controller apparatus CCU by executing programs stored in ROM 104 and nonvolatile memory 106.

Nonvolatile memory 106 stores the control information storage table 106a. The data structure of the control information storage table 106 is shown in FIG. 10. Stored in control information storage table 106a as shown in FIG. 10 are: the ID assigned to this communications controller apparatus CCU, a size indicating the size of the tile carpet involving the communications controller apparatus CCU, a connection number indicating the maximum number of connections for other tile carpets CPn to which this tile carpet CPn can connect, and connection locations indicating the locations to which other tile carpets CPn connect.

As well, the IDs of other communications controller apparatus CCU connected to each of the internal wirings Win (connectors CNn) are stored in control information storage table 106a as destination IDs. Furthermore, location information that indicates the location where this tile carpet CPn is laid out is recorded in control information storage table 106a. The location information is information that indicates latitude, longitude, altitude, address and building name, floor, room, and the like.

<4. Update of Network Topology>

Figure 11:
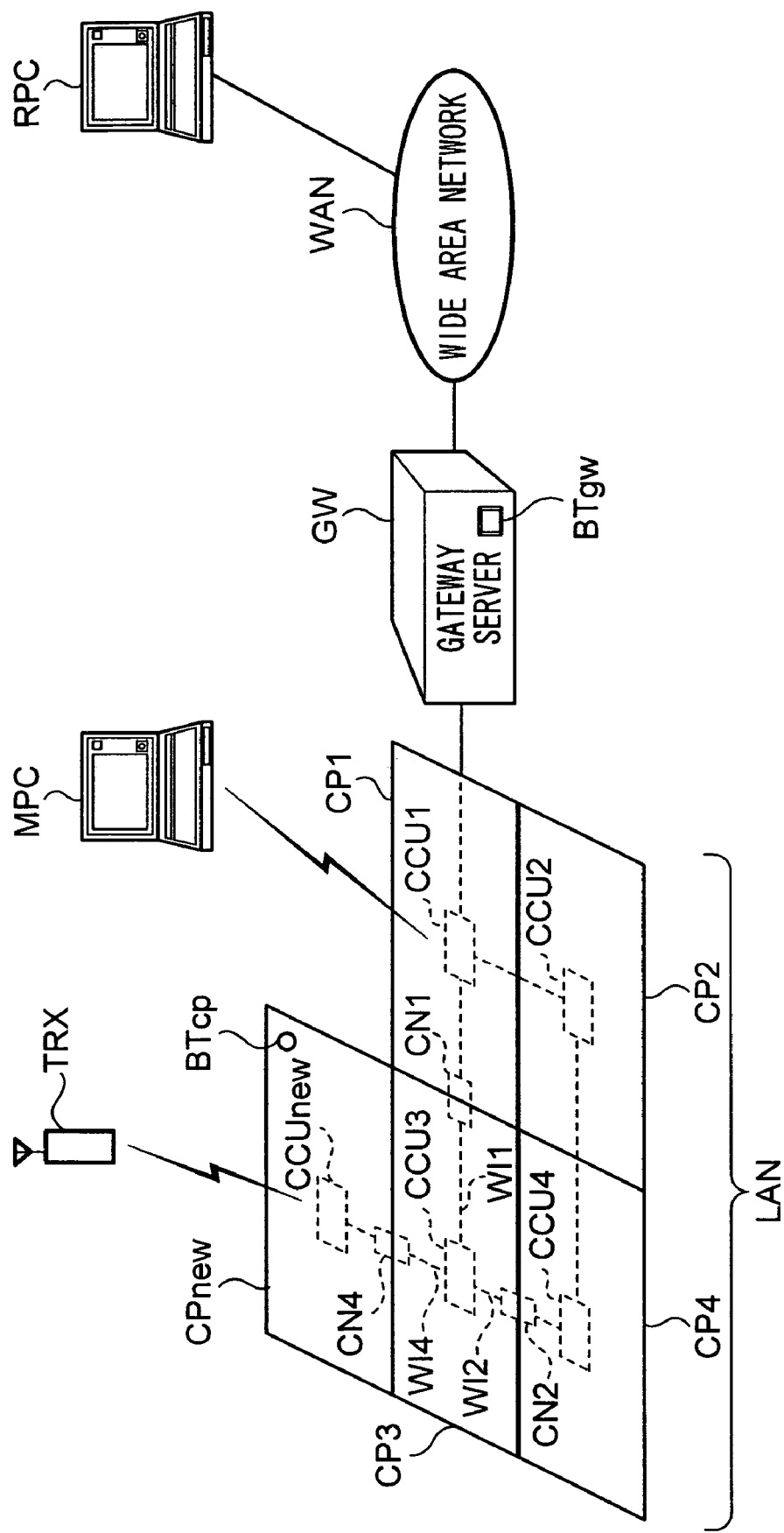
FIG. 11 is a diagram for describing updates of the network topology for a local area network LAN according to the same preferred embodiment.

Next, updates of the network topology of local area network LAN are explained with reference to FIG. 11. Moreover, as shown in FIG. 10, the case of adding a new tile carpet CPnew to the local area network LAN formed by the four tile carpets CP1-CP4 will be explained. However, updates of the network topology are also performed in such cases as when removing a tile carpet CPn composing local area network LAN.

First, the worker lays out the new tile carpet CPnew beside tile carpet CP3. At this point, tile carpet CPnew is connected to tile carpet CP3 using connector CN4. Then, when the operation button BTcp provided in tile carpet CPnew is pushed by the worker, the communications controller apparatus CCUnew in this tile carpet CPnew transmits to communications controller apparatus CCU3 of tile carpet CP3 a connection update signal to notify that the connection status of local area network LAN is updated.

When receiving the connection update signal, communications controller apparatus CCU3 transmits the connection update signal through local area network LAN to gateway server GW. When receiving the connection update signal, gateway server GW transmits a topology update command that instructs the update to the network topology to each communications controller apparatus CCUn (CCU1-CCU4, CCUnew) forming the local area network LAN. Moreover, the transmission of the topology update command is not limited to the case of receiving connection update signals from communications controller apparatus CCUn. Even in the case where operation button BTgw provided to gateway server GW is pushed, the topology update command is transmitted to each communications controller apparatus CCUn from the gateway server GW.

When receiving the topology update command from gateway server GW, each communications controller apparatus CCUn performs, for each internal wiring Win (each connector CNn), consecutive communications with other communications controller apparatus connected to said internal wiring Win, and updates the data of the "destination ID" item in control information storage table 106a.

To specifically explain the update to the destination ID, CPU 103 in communications controller apparatus CCUn, first, reads out its own ID from control information storage table 106a. CPU 103 transmits the ID to a destination communications controller apparatus CCUn. As well, when receiving the ID of the destination apparatus from the destination communications controller apparatus CCUn, CPU 103 records this ID in the "destination ID" item of the control information storage table 106a in correspondence with internal wiring Win connected to the destination. Moreover, concerning internal wiring Win to which other communications controller apparatus CCUn is not connected, the "destination ID" item records the information that communications controller apparatus CCUn is not connected.

For example, for the communications controller apparatus CCU3 of tile carpet CP3, the IDs of communications controller apparatus CCU1, CCU4, and CCUnew are stored as destination IDs. CCU1, CCU4, and CCUnew are stored correspondingly with internal wiring W11, W12, and W14, respectively. As well, for internal wiring W13, information indicating that it is unconnected is recorded.

Thus, the network topology of the local area network LAN is updated, and tile carpet CPnew is added to the local area network LAN. Accordingly, communications apparatus TRX can access the wide area network WAN through the local area network LAN and the gateway server GW with communications controller apparatus CCUnew of tile carpet CPnew as an access point. Of course, it is possible to perform communications between two communications apparatus TRX connected by the local area network LAN.

Moreover, in such cases where it is possible for communications apparatus TRX to perform wireless communications with a plurality of communications controller apparatus CCUn, such as a case locating a communications apparatus TRX in the boundary vicinity in contact with a tile carpet CPn companion, communications apparatus TRX measures the strength of the received electromagnetic waves of the wireless signal transmitted from each communications controller apparatus CCUn, and performs wireless communications by selecting the communications controller apparatus CCUn that transmitted the strongest signal. As well, in the case of performing communications with communications apparatus TRX, each communications controller apparatus CCUn acquires the terminal ID (for example, the MAC address) for identifying the communications apparatus TRX, and registers in gateway server GW the terminal ID and its own ID (location registration). Moreover, the server performing this registration may be performed by a different server than gateway server GW, and may be a server especially for the purpose of location registration.

As well, each communications controller apparatus CCUn may also communicate such information as the size and form of tile carpet CPn, the number of connections, and the connection location as well as the ID, with another communications controller apparatus CCUn. Furthermore, the gateway server GW is notified of this information and of the network topology of the local area network LAN.

The gateway server GW performs calculation using information such as the network topology, the size, form, number of connections, and connection location of each tile carpet CPn, and displays in a display apparatus (not shown) connected to the gateway server GW the body form of the tile carpet CPn constructed, the locations to which a tile carpet CPn can be added, and the like.

As well, the location information for a specific tile carpet CPn such as tile carpet CP 1 is stored in the gateway server GW as reference point information. The gateway server GW performs operation processing and calculates the location information of each tile carpet CPn, using this reference point information and information such as the network topology, and the size, form, number of connections, and connection location of each tile carpet CPn. The location information for each tile carpet CPn is transmitted from gateway server GW to each communications controller apparatus CCUn to which the location information corresponds, and a "location information" item is recorded in control information storage table 106a. When performing wireless communications with communications apparatus TRX, communications controller apparatus CCUn reads out the "location information" in response to its necessity. Communications controller apparatus CCUn notifies the location information to communications apparatus TRX.

In this way, it is possible for communications apparatus TRX to acquire its own location information by the size of tile carpet CPn. In this case, even if it is difficult to measure the location by GPS (Global Positioning System), such as the interior of a building or underground, the local area network LAN can provide high accuracy location information for communications apparatus TRX.

Moreover, processing of location information, such as the connection status or the arrangement (layout) of each tile carpet CPn, need not be performed in the gateway server GW, but may be performed in a management terminal MPC for managing the local area network LAN, or in an information processing apparatus RPC connected to the wide area network. Alternatively, such processing may be performed by any communications controller apparatus CCUn involved in the local area network LAN.

According to the present embodiment described above, a plurality of unitary tile carpets CPn are laid out, and by connecting tile carpets CPn through connectors CNn, one can easily install a local area network LAN, in which communications apparatus TRX functions as a terminal. As well, maintenance and conversion of tile carpets CPn is also easy, because they are unitary flooring. Furthermore, one can provide to communications apparatus TRX highly accurate location information by the size of tile carpet CPn.

As well, in comparison to communications systems for use in present day cellular phones and PHS (Personal Handyphone System: registered trademark), the wireless area covered by one base station (communications controller apparatus CCUn) is very small. Accordingly, it is possible to reduce the electromagnetic wave transmission power of a communications apparatus TRX, and lengthen the operation time possible with one charging session for a communications apparatus TRX.

Modifications of the First Embodiment

<First Modification>

In the first embodiment, when the operation button BTcp of added tile carpet CPnew is pressed, a connection update signal is transmitted to the gateway server GW. However, by pressing the operation buttons BTcp of the already laid-out tile carpets CP1-CP4, a connection update signal may be transmitted to the gateway server GW. As well, tile carpet CPn may have a switch to detect the attaching of connector CNn, and when the installation of connector CNn is detected by said switch, a connection update signal may be transmitted to the gateway server GW. Alternatively, when another communications controller apparatus CCUn detects something like a startup packet that arrives on the data bus when the added communications controller apparatus CCUnew initially starts up, a connection update signal may be transmitted to the gateway server GW.

<Second Modification>

A communications controller apparatus CCUn for the first embodiment may notify communications apparatus TRX of its own ID instead of its location information. In this case, the local area network LAN or the wide area network connects to the location information provider server, and the ID of each communications controller apparatus CCUn is put into correspondence with the location information on this location information provider server. Communications apparatus TRX submits a location inquiry to the location information provider server using the ID acquired from communications controller apparatus CCUn, and acquires the location information. As well, one may hold in communications apparatus TRXn data indicating the correspondence of the ID of each communications controller apparatus CCUn with its location information. In this case, communications apparatus TRX can acquire the location information without submitting an inquiry to the location information provider server.

<Third Modification>

With the first embodiment, it has been explained that, after laying out a tile carpet CPn, the location information for this tile carpet CPn is requested of the gateway server GW. The location information is notified to communications controller apparatus CCUn. However, the worker doing the tile carpet CPn layout may decide the layout location of this tile carpet CPn before laying out tile carpet CPn. The worker may have communications controller apparatus CCUn to store in advance location information indicating this location.

<Fourth Modification>

Figure 12:
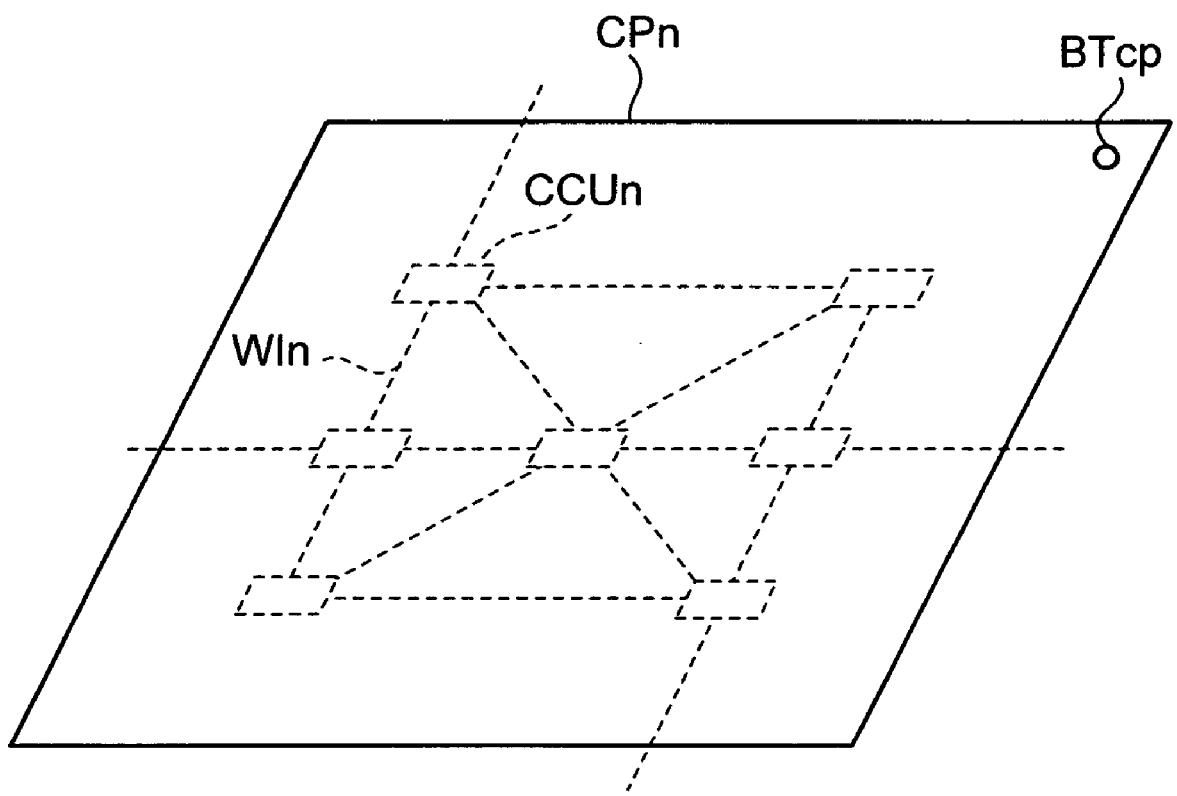
FIG. 12 shows a tile carpet CPn according to a fifth modification of the first embodiment.

A tile carpet CPn may have a plurality of communications controller apparatus CCUn, as shown in FIG. 12. The plurality of communications controller apparatus CCUn are placed at a certain interval and may be connected to each other by internal wiring Win. As well, in the case where several tile carpets CPn are laid out, there is no need for all tile carpets CPn to have a communications controller apparatus CCUn. In other words, one may use a single tile carpet provided with only data bus and power lines, not equipped with a communications controller apparatus CCUn.

<Fifth Modification>

With the first embodiment, the case of communications apparatus TRX being a portable communications device was explained. However, communications apparatus TRX may be a fixed communications device, such as a desktop personal computer. As well, the wireless communications performed between communications apparatus TRX and tile carpet CPn, includes IR (infrared) communication. Furthermore, wireless communications may be performed between communications apparatus TRX and tile carpet CPn. In this case, a connection part for plugging in a communications cable that connects to communications apparatus TRX is provided on the surface of tile carpet CPn. Moreover, the wireless communications includes optical communications.

<Sixth Modification>

The communications unit of the present invention can be installed in other tile carpets described in the first embodiment, such as mats and tatami. As well, the communications unit may be installed in a unitary panel built into the ceiling and walls, and a unitary floor panel constructed into the floor itself. Moreover, the member in which the communications unit is installed is not restricted to a member having a flat form. For example, the member may have the form of a box having a certain thickness. Furthermore, the layout locations of the communications units are not limited to the insides of rooms. For example, for outdoor use, the communications unit may be installed in a unitary artificial lawn mat.

B. Second Embodiment

Next, in the present embodiment, the explanation will be given for the case of applying the present invention to communications using electric fields induced in a dielectric such as the human body. Such communications technology is disclosed, for example, in T. G. Zimmerman's paper "Personal Area Networks: Near-Field Intrabody Communication" (IBM System Journal Vol.35, No. 3&4, 1996-MIT Media Laboratory), in the Japanese Patent Application Laid-Open Publication No. 10-229357 and in the Japanese Patent Application Laid-Open Publication No. 2001-298425. The patent documents are related to the inventions by the present inventor.

Moreover, for the present embodiment, the same reference numerals and symbols are used for parts in common with the first embodiment. As well, explanation is omitted for parts in common with the first embodiment.

<1. Configuration of the Communication System>

Figure 13:
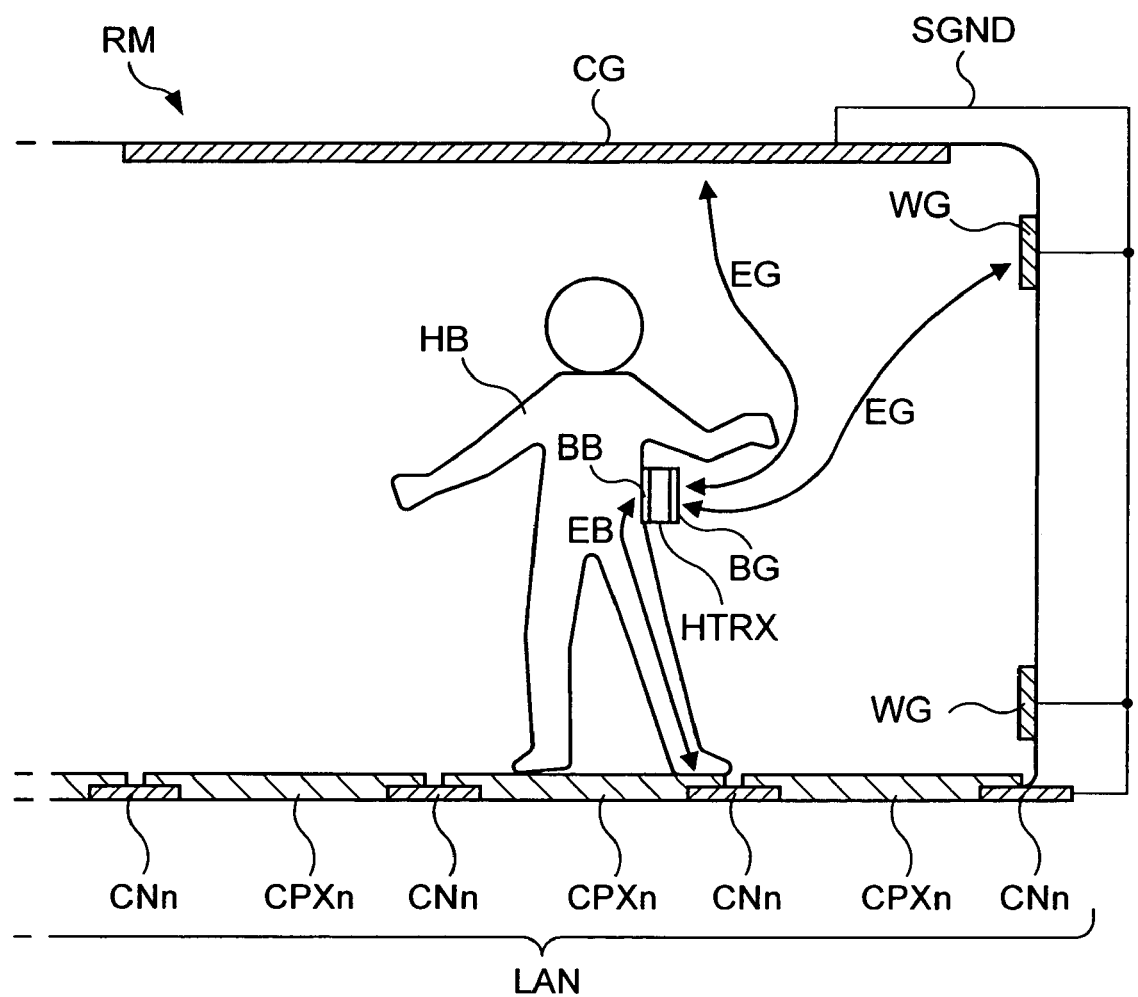
FIG. 13 shows the configuration of a communication system according to the second embodiment of the present invention.

FIG. 13 shows a communication system according to the second embodiment of the present invention. As in the same figure, each tile carpet CPXn forming the local area network LAN, is laid out on the floor inside room RM. Adjoining tiles are connected through connector CNn. As well, each tile carpet CPXn performs communications with others, through the data bus between the adjoining tile carpets CPXn, using an electric field as the transmission path between communications apparatus HTRX and human body HB. As well, though not shown in the figures, the local area network LAN is connected to the wide area network WAN through the gateway server GW as explained in the first embodiment.

Return electrode CG is formed on the ceiling of room RM. As well, return electrodes WG are formed on the walls. These return electrodes CG and WG are connected to GND1 and GND2 among the power lines (GND1, GND2, Vcc) of tile carpet CPXn. Ground voltage SGND is applied to GND1 and GND2.

A person wears communications apparatus HTRX around his/her waist in a way that touches his/her skin. Communications apparatus HTRX is a device that performs communications using electric fields with human body HB as a transmission path. The communications apparatus HTRX has a cabinet covered by insulating material. As shown in FIG. 13, there is provided main electrode BB on the human body HB side of the surface of the cabinet, and return electrode BG is provided on an opposite side surface of the cabinet to main electrode BB. Moreover, the surfaces of main electrode BB and return electrode BG are both covered with an insulating layer.

As well, in the case of performing communications using communications apparatus HTRX, main electrode BB needs to directly touch human body HB, or be on clothing only a small distance away from human body HB. For this reason, with communications apparatus HTRX, in order to be close to human body HB, main electrode BB is formed on the pelvic region or on the wrist using a strap or the like.

The communications apparatus HTRX modulates the carrier waves whose frequency is above the tens of kHz, which is preferable for transmission in human body HB, according to a signal that corresponds to data transmitted. A voltage difference arises between main electrode BB and return electrode BG based on the modulated signal. In this way, an electric field corresponding to the modulation signal is yielded in human body HB. As well, communications apparatus HTRX measures the voltage difference between main electrode BB and return electrode BG by the electric field yielded by human body HB. Communications apparatus HTRX acquires the modulation signal used by other communications apparatus HTRX in order to transmit data. Communications apparatus HTRX receives the data transmitted by demodulating this modulated signal. The apparatus performing communication using a similar theory of operation for communications apparatus HTRX is installed in each tile carpet CPXn laid out on the floor, and communications apparatus HTRX performs communications with these apparatus.

Figure 14:
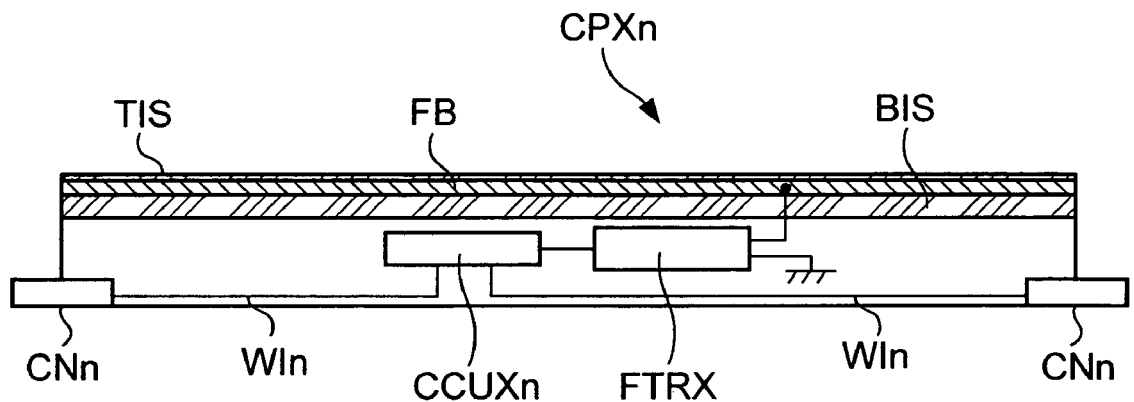
FIG. 14 shows a cross sectional view of the internal composition of a tile carpet CPXn according to the second embodiment.

Next, the internal construction of tile carpet CPXn is shown in cross sectional view in FIG. 14. As shown in FIG. 14, communications controller apparatus CCUXn and communications apparatus FTRX are provided inside tile carpet CPXn. What differs between communications controller apparatus CCUXn according to the present embodiment and the communications controller apparatus CCUn explained in the first embodiment is only that communications controller apparatus CCUn has communications apparatus FTRX instead of wireless communications part 101.

As well, similarly to the first embodiment, the internal wiring Win having the power lines (GND1, GND2, Vcc) and the data buses (BUS1, BUS2) is connected to communications controller apparatus CCUXn. These power lines and data buses are connected to communications controller apparatus CCUXn to adjoining tile carpets CPXn through connector CNn.

Communications apparatus FTRX performs communications using electric fields to communicate with communications apparatus HTRX worn on a person (human body HB) who is on tile carpet CPXn. In this case, human body HB is used as a transmission path. The main electrode FB of this communications apparatus FTRX is provided on the surface of tile carpet CPX. This main electrode FB is covered with insulating layer TIS on its top surface. An insulating layer made of insulating material is provided on the bottom surface. As well, communications apparatus FTRX is connected to return electrode CG provided in the ceiling, and return electrodes WG provided in the walls, as return electrodes.

As well, communications apparatus FTRX is connected to power lines for supplying driving force. The power lines are also connected to communications controller apparatus CCUXn. In addition, data buses are connected both communications apparatus FTRX and communications controller apparatus CCUXn to perform transfer of data between communications apparatus FTRX and communications controller apparatus CCUXn. As well, ground voltage SGND acquired from earth for communications apparatus FTRX is supplied to GND1 and GND2 of internal wiring Win. Thus, ground voltage SGND is supplied to return electrodes CG and WG provided in the ceiling and the walls.

Moreover, in the above description of the present embodiment, the main electrode BB of communications apparatus HTRX and the main electrode FB of communications apparatus FTRX are covered with insulating material. However, these electrodes BB and FB do not necessarily need to be covered with insulating material. However, main electrodes BB and FB are ordinarily made of conducting material, and may contain metal ions. There are cases where metal allergies are triggered by prolonged skin contact with materials containing metal ions. In order to prevent this problem the surface of main electrodes BB and FB are covered with insulation with the present invention. As well, by covering the surfaces of main electrodes BB and FB with insulator, human body HB is insulated from communications apparatus HTRX and communications apparatus FTRX. The insulation also has the effect of preventing events such as electric shocks.

<2. Communications Theory of Operation>

The transmitter and receiver devices mentioned in Japanese Patent Application Laid-Open Publication No. 10-229357 and Japanese Patent Application Laid-Open Publication No. 2001-298425 do not necessarily ensure sufficient communications range.

For example, in Japanese Patent Application Laid-Open Publication No. 10-229537, to solve the problem of external grounding, the return electrodes for the receiver and the transmitter are put closer together, and by electrostatic coupling establish a return path through the air. However, establishing a return path using electrostatic coupling through the air naturally limits the distance between return electrodes of the receiver and the transmitter. In the case of transmitter and receiver in the Patent Publication, the sizes of the transmitter and receiver themselves are reduced, and both return electrodes are also small, but a transmitter installed on a person's head, and a receiver installed on the pelvic region would in fact have difficulty communicating with each other.

On the other hand, in Japanese Patent Application Laid-Open Publication No. 2001-229357, the return electrode is removed, and what is used as substitute means for the return electrode is the cabinet for the transmitter and the receiver. This disclosure also proposes an electro-optical crystal having the Pockels Effect, and discloses the use of an electric field sensor with greater sensitivity. In the case of employing a sensor that uses an electro-optical crystal, it is necessary for the electric field strength at the location of the electro-optical crystals to be high to enhance sensitivity of the electric field sensor. However, the Patent Publication does not disclose the distribution of the electric field inside the receiver. In particular, according to the configuration disclosed in the Patent Publication, because the entire cabinet becomes the return electrode for the receiver, there remains considerable doubt as to whether the electric field intensity can be sufficiently increased for the location of the electro-optical crystals.

On the contrary, communications apparatus HTRX and communications apparatus FTRX in the present embodiment have configurations described below that can gain a relatively greater range for communication. In the explanation below, explanations for transmitter TX and receiver RX are separated, for simplifying the description.

Figure 15:
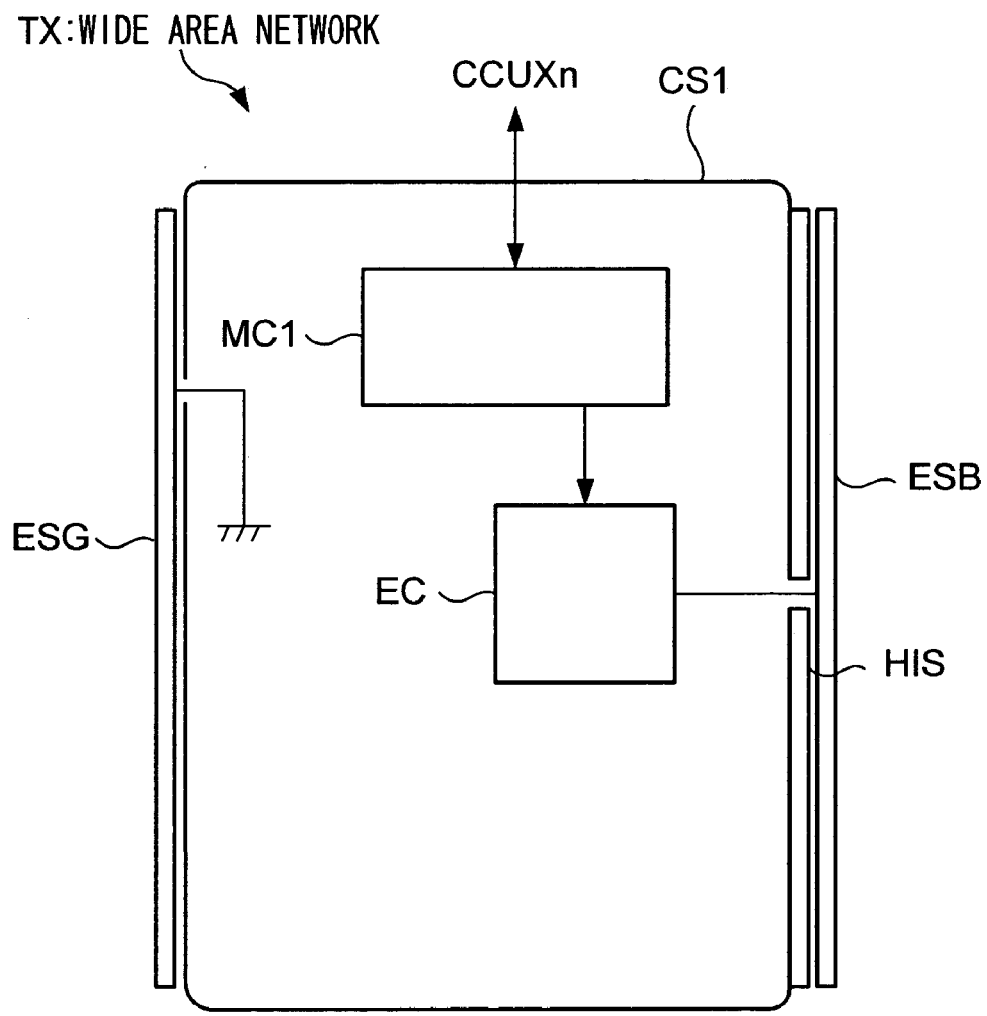
FIG. 15 is a block diagram showing the configuration of a transmitter TX according to the second embodiment.

First, transmitter TX, as shown in FIG. 15, has a microcontroller MCi and a modulator EC in cabinet CS1. As well, on the face of CS1 touching human body HB, a main electrode ESB is provided through insulator HIS, and a return electrode ESG is provided on the side of cabinet CS1 facing the main electrode ESB. This return electrode ESG is connected to the ground and is applied with a ground voltage. As well, both main electrode ESB and return electrode ESG are covered with an insulating layer. This transmitter TX also has a battery, memory, operation keys, a display, and a speaker, among other things. These elements are not shown in the figures for simplifying the drawings. When connected to a power supply (not shown), microcontroller MC1 reads and executes a program stored in memory and performs control of the various parts of transmitter TX. This microcontroller MC1 outputs to modulator EC a signal that corresponds to data transmitted to receiver RX. Modulator EC, using the signal acquired from microcontroller MC1, modulates the carrier wave having carrier frequencies above the tens of kHz, which is preferable for good conductivity in human body HB. By this means, a voltage difference arises between main electrode ESB and return electrode ESG, and an electric field corresponding to the signal after modulation is provided to the human body HB. Moreover, by using carrier frequency of the carrier waves used by modulator EC, which is not easily interfered with noise from the environment, it is possible to improve the stability of the communication quality.

Figure 16:
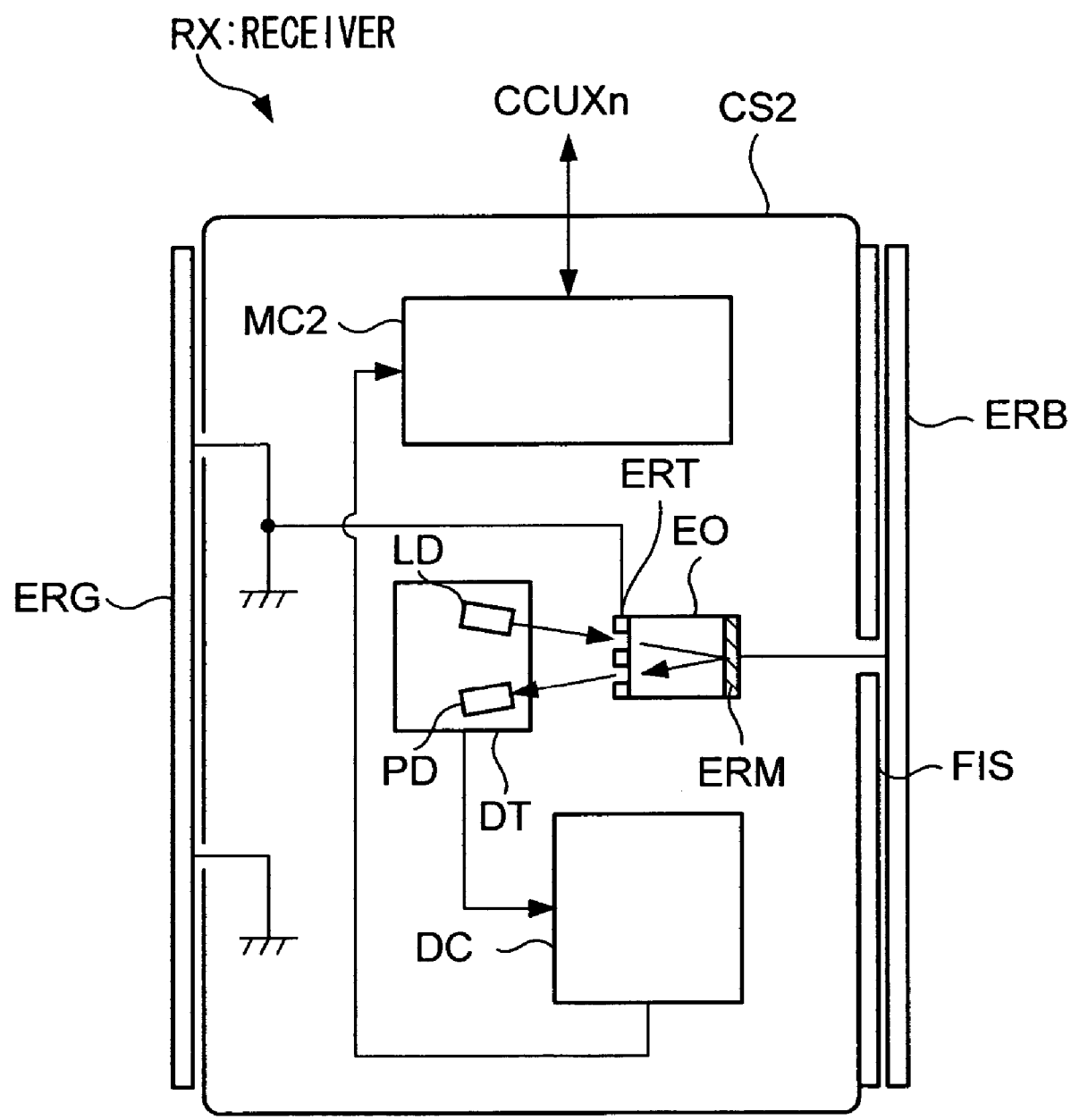
FIG. 16 is a block diagram showing the configuration of a receiver RX according to the same preferred embodiment.

Next, as shown in FIG. 16, receiver RX has electro-optical crystal EO, electrodes ERM and ERT for use with EO, light meter DT, demodulator DC, and microcontroller MC2, in cabinet CS2. As well, insulator FIS is provided between cabinet CS2 and main electrode ERB, and return electrode ERG acquires a ground voltage by being connected to the ground. As well, main electrode ERB and return electrode ERG are both covered with an insulating layer. This receiver RX also has a battery, memory, operation keys, a display and a speaker, among other things. These elements are not shown in the figures for simplifying the drawings. Electro-optic crystal EO is a crystal such as, for example, CdTi, CdTe, ZnTe, $Bi_{12}SiO_{20}$, $Bi_{12}TiO_{20}$, $Bi_{12}GeO_{20}$, $Bi_4Ge_3O_{12}$, $LiNbO_3$, $LiTaO_3$ or DAST (dimethyl-amino-stilbazolium tosylate). The electro-optical crystal EO shows the Pockels Effect, by which its refractive index changes proportional to the strength of the electric field. Electrode ERM for use with EO is formed on an end face of electro-optical crystal EO and is connected to main electrode ERB. As well, the surface touching electro-optical crystal EO, of the electrode ERM for use with EO is mirrored, and reflects laser light emitted from light detector DT. On the contrary, electrode ERT for use with EO is formed on an end face of electro-optical crystal EO facing opposite electrode ERM for use with EO, and is connected to return electrode ERG.

Light detector DT measures the refractive index of electro-optical crystal EO. The light detector DT has a light source having, for example, a semiconductor laser diode LD that emits laser light on electro-optical crystal EO, and a light receiver having, for example, a photodiode for receiving laser light emitted from semiconductor laser diode LD.

Here, the laser light emitted from semiconductor laser diode LD penetrates through electro-optical crystal EO and is reflected by electrode ERM for use with EO. After penetrating the polarizing plane provided in the light receiver, the laser light is received by photodiode PD. At that point, in the case of changing in the refractive index of electro-optical crystal EO in response to changing the electric field strength in electro-optical crystal EO, the polarization conditions of the laser light that penetrates through electro-optical crystal EO change in response to the change in this refractive index. The change in the polarization condition brings with it a change in the intensity of the laser light penetrating through the polarization plane, that is, in the amount of light received by photodiode PD. Light detector DT measures the change in refractive index of electro-optical crystal EO based on the change in the amount of received light, and outputs to demodulator DC a signal that indicates the result of the measurement.

Demodulator DC demodulates, based on the signal output from light detector DT, the modulated signal that transmitter TX uses to transmit data. As well, microcontroller MC2 acquires data that transmitter TX transmitted, based on the demodulation result acquired from demodulator DC.

Moreover, various systems for modulation and demodulation can be used for the modulator of transmitter TX and the demodulator DC of receiver RC, such as AM (Amplitude Modulation), PM (Phase Modulation), FM (Frequency Modulation), PCM (Pulse Code Modulation), SS (Spread Spectrum), CDMA (Code Division Multiple Access) and UWB (Ultra Wide Band).

Now, receiver RX is improved as explained below, to raise the receiver sensitivity by increasing the electric field strength at the location of electro-optical crystal EO.

Figure 17:
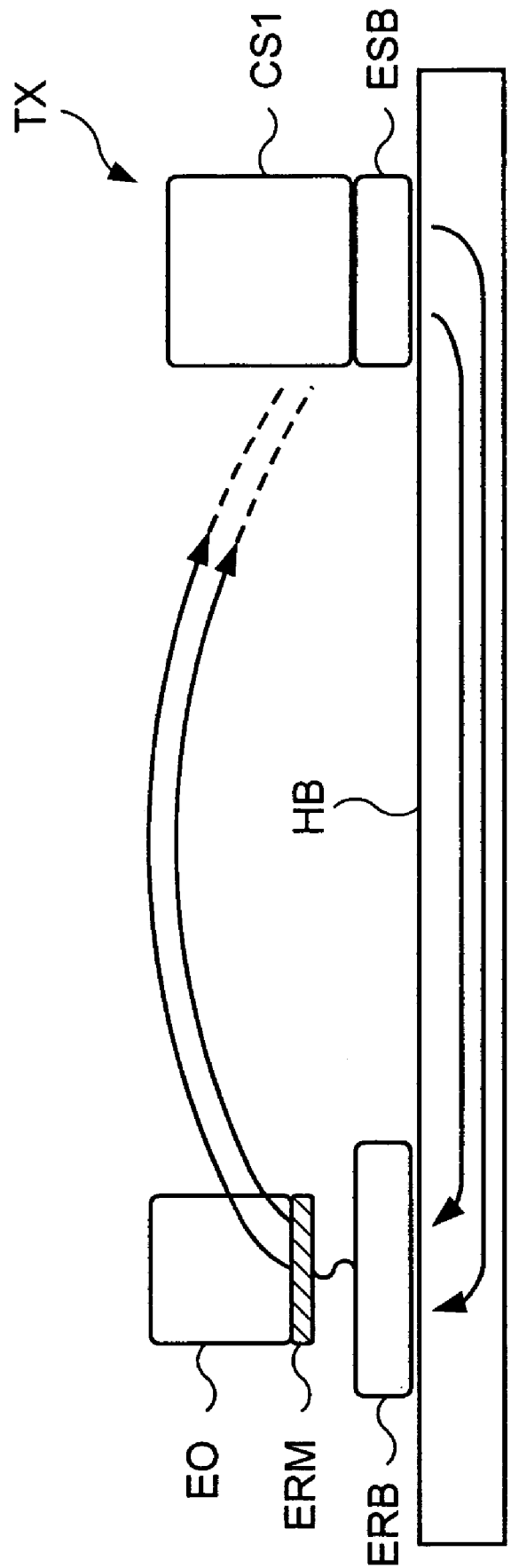
FIG. 17 shows schematically, using electric field force lines, the distribution of the electric field in the case where respective return electrodes of transmitter TX and receiver RX are not provided, according to the second embodiment.

First, FIG. 17 shows schematically, using electric field force lines, the distribution of the electric field in the case where, respective receiver return electrodes are not provided in transmitter TX and receiver RX. When a transmitter TX worn on human body HB generates an electric field, the electric field force lines spread out in human body HB, which is a dielectric. The electric field force lines are distributed to a relatively greater distance compared to the case where transmitter TX is put in free space. As well, the electric field force lines are concentrated by main electrode ERB of receiver RX and also concentrated by electrode ERM for use with EO connected to the main electrode ERB. Moreover, electro-optical crystal EO has a columnar form. In the lower face (circular), electro-optical crystal EO has electrode ERM for use with EO. Electrode ERM has a circular form and the size of electrode ERM is the same as the lower face.

Here, in the case of the construction shown in FIG. 17, transmitter TX and receiver RX are provided with respective return electrodes. For this reason, the number of electric field force lines precisely passing through to the surface from the lower face of electro-optical crystal EO to the upper face is reduced as shown in FIG. 17, which shows the electric field force lines that flow out from the side of electro-optical crystal EO and return to cabinet CS1 of transmitter TX. Here, because the electric field force lines shows the strength and direction of the electric field, the number of electric field force lines passing through electro-optical crystal EO is small; in other words, that the density of the electric field force lines for electro-optical crystal EO is low, means that the field strength is weak at the location of electro-optical crystal EO. It follows, naturally, that the refractive index of electro-optical crystal EO will become smaller, and it will be difficult to sufficiently increase the sensitivity of receiver RX.

Figure 18:
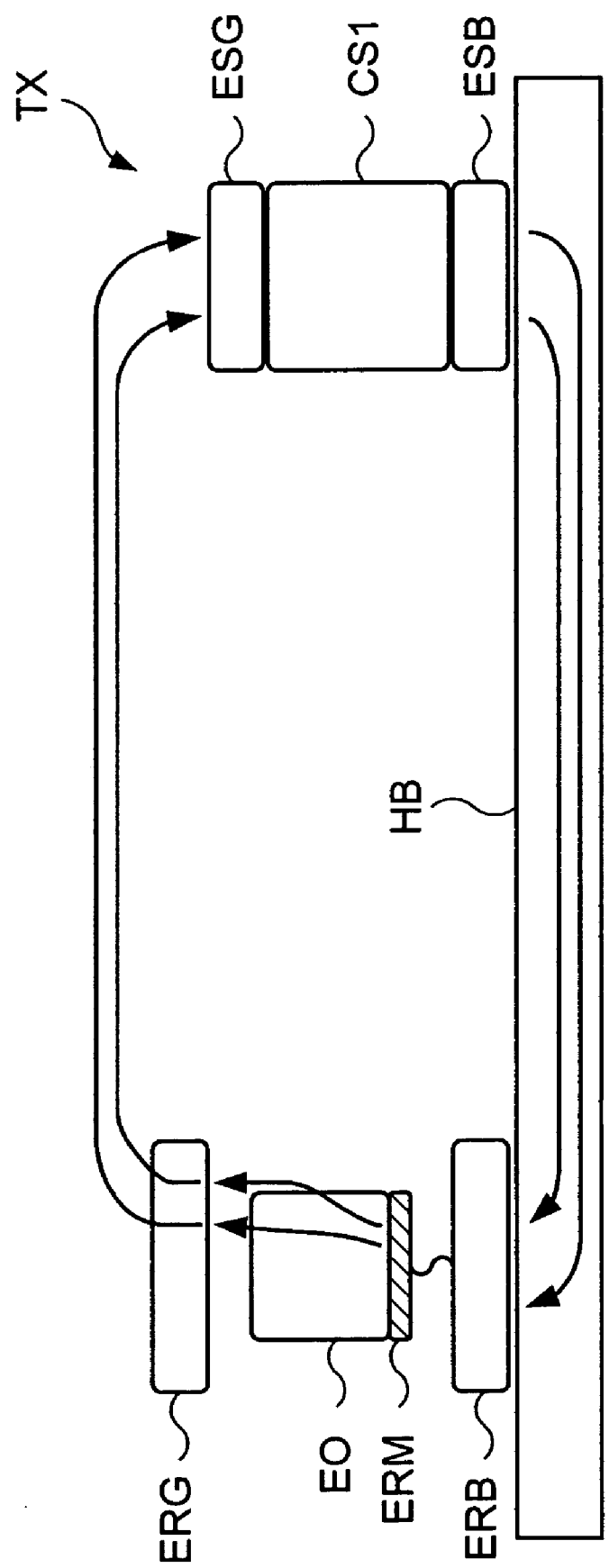
FIG. 18 shows schematically, using electric field force lines, the distribution of the electric field in the case where return electrode ESG is provided in transmitter TX, and return electrode ERG is provided in receiver RX, according to the second embodiment.

Next, FIG. 18 schematically shows, using electric field force lines, the distribution of the electric field in the cases where return electrode ESG is provided to transmitter TX, and return electrode ERG is provided to receiver RX. First, when transmitter TX generates an electric field, the electric field force lines reach to electrode ERM for use with EO of receiver RX similarly to the case shown in FIG. 17.

Here, in the case of the configuration shown in FIG. 17, each transmitter TX and receiver RX are provided with return electrodes ESG and ERG respectively. These two return electrodes ESG and ERG establish a return path by electrostatic coupling through the air. Accordingly, when comparing to the case of FIG. 17, one can see a decrease in the electric field force lines flowing out from the side of electro-optical crystal EO, among the electric field force lines reaching to electrode ERM for use with EO. In other words, when comparing to the case of FIG. 17, one can see that the electric field intensity is relatively increased for the location of electro-optical crystal EO. However, as shown in FIG. 18, there is still left some scope for further increasing the electric field intensity for disposition location of electro-optical crystal EO, so as to indicate the electric field force lines reaching to return electrode ERG flowing from the side of electro-optical crystal EO.

Figure 19:
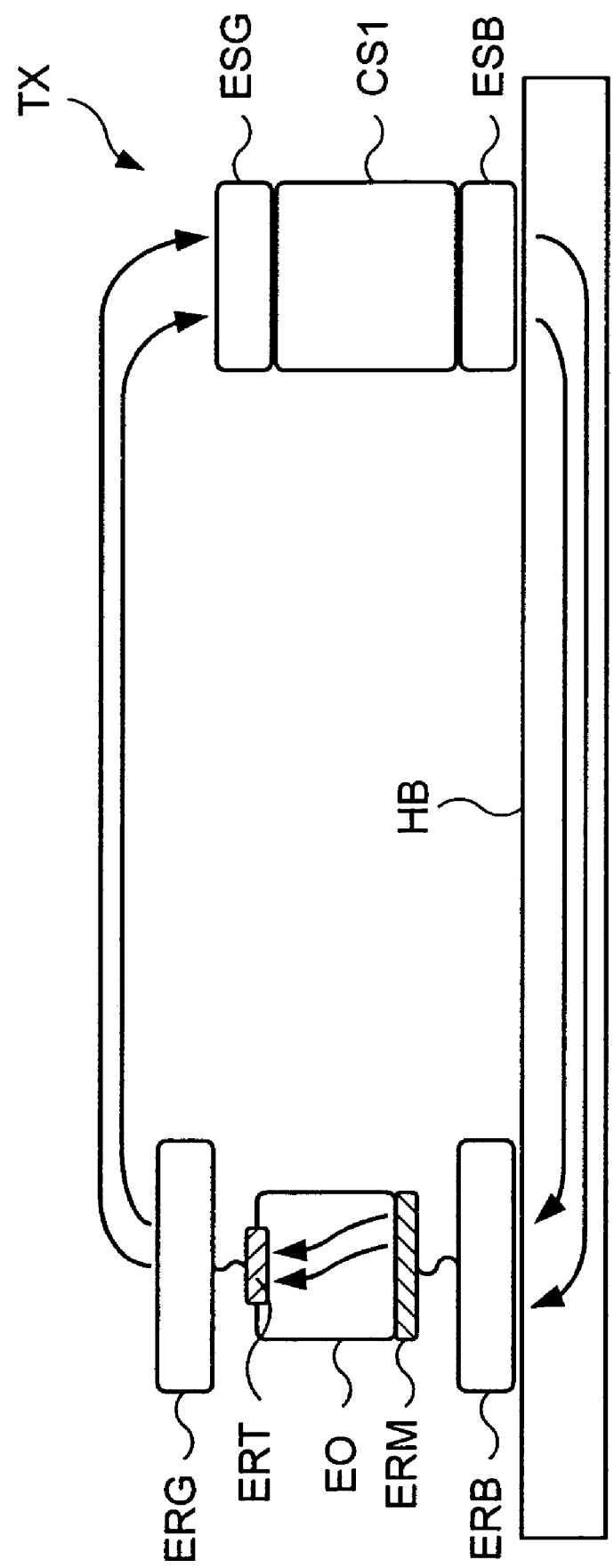
FIG. 19 shows schematically, using electric field force lines, the distribution of the electric field in the case where, for the configuration shown in FIG. 18, return electrode ERT for use with EO is connected to return electrode ERG, according to the second embodiment.

Next, FIG. 19 shows schematically, using electric field force lines, the distribution of the electric field in the case where electrode ERT for use with EO connects to return electrode ERG as well as the configuration shown in FIG. 18. As shown in FIG. 19, an electrode ERT for use with EO is provided on the surface of electro-optical crystal EO having a somewhat smaller size than that surface. In this case, by providing electrode ERT for use with EO, all electric field force lines that reached electrode ERM for use with EO through main electrode ERB reach electrode ERT for use with EO, precisely passing through to the surface from the lower face of electro-optical crystal EO. In other words, all electric field force lines that reached electrode ERM for use with EO pass through electro-optical crystal EO, with none left over. Accordingly, it is possible to increase the density of the electric field force lines for electro-optical crystal EO, and to maximize the electric field intensity for the location of electro-optical crystal EO. Consequently, it becomes possible to increase the reception sensitivity of receiver RX, compared with the configurations shown in FIG. 17 and FIG. 18.

Additionally, because all electric field force lines that reached electrode ERM for use with EO reach return electrode ERG through electrode ERT for use with EO, the degree of electrostatic coupling through the air between return electrode ERG of receiver RX and return electrode ESG of transmitter TX is also increased compared to the case shown in FIG. 17. In addition, it becomes possible to extend the range between return electrode ERG and return electrode ESG.

The present embodiment employs communications apparatus HTRX and communications apparatus FTRX, both of which have functions of transmitter TX and receiver RX. In addition, the present embodiment employs the configuration shown in FIG. 19. Accordingly, comparative to the disclosure of Japanese Patent Application Laid-Open Publication No. 10-229357 and Japanese Patent Application Laid-Open Publication No. 2001-298425, it is possible to gain an increase in communication range.

Moreover, as for electrode ERM for use with EO and electrode ERT for use with EO, they are not restricted to the examples shown in FIG. 17-19. However, it is preferable that they have approximately the same size as the lower face of the surface of electro-optical crystal EO, or a smaller size than that. Of course, the form of electro-optical crystal EO is not restricted to being columnar. As well, for each configuration shown in FIG. 17-19, electrode ERM for use with EO and electrode ERT for use with EO do not necessarily need to be in contact with electro-optical crystal EO, but need to be arranged to be opposing so as to have electro-optical crystal EO interposed between them. Additionally, electrode ERM for use with EO is not necessarily connected to main electrode ERB. In addition, electrode ERT for use with EO is not necessarily connected to return electrode ERG. In other words, if electrode ERM for use with EO is provided so as to be adjoining main electrode ERB, and electrode ERT for use with EO is provided so as to be respectively adjoining return electrode ERG, they can function in the same roles as in the case where they are connected, even if they are not connected.

Now, we return to the explanation of FIG. 13. As described in the above explanation, communications apparatus HTRX and communications apparatus FTRX have both functions of transmitter TX and receiver RX. Moreover, communications apparatus HTRX has main electrode BB as a main electrode that functions as main electrode ESB of the transmitter and main electrode ERB of the receiver. In addition, communications apparatus HTRX has return electrode BG as return electrode that functions return electrode ESG of the transmitter, and return electrode ERG of the receiver. As well, main electrode FB, which is formed on an upper face of tile carpet CPXn and is an integrated electrode of transmitter main electrode ESB and receiver main electrode ERB, is connected to communications apparatus FTRX. Also, return electrode CG and WG, which are formed on a ceiling or wall and are integrated electrodes of transmitter return electrode ESG and receiver return electrode ERG, is connected to communications apparatus FTRX. Of course, in communications apparatus HTRX and communications apparatus FTRX, transmitter main electrode ESB and receiver main electrode ERB, or transmitter return electrode ESG and receiver return electrode ERG, may be separated two electrodes.

As well, communications apparatus HTRX and communications apparatus FTRX according to the present embodiment have configurations as shown in FIG. 19. Therefore, it is possible to establish sufficient electrostatic coupling through the air between return electrode BG and both return electrodes CG and WG if distance between return electrode BG and both return electrodes CG and WG (the return electrodes of communications apparatus FTRX) is nearly equal to that of return electrode BG and both return electrode CG and WG.

The explanation will be given for the transmission path in the case that communications is performed between communications apparatus FTRX of tile carpet CPXn and communications apparatus HTRX, with reference to FIG. 13. First, when communications apparatus HTRX generates an electric field, the electric field force lines spread out from human body HB and are collected into main electrode FB provided on the surface of tile carpet CPXn. Then, they are drawn into communications apparatus FTRX, and electrode ERM for use with EO connected to main electrode FB and reach electrode ERT for use with EO through electro-optical crystal EO. As well, to explain the transmission path for return, the electric field force lines are drawn toward return electrodes CG and WG provided in the walls and ceiling, from electrode ERT for use with EO inside communications apparatus FTRX, through internal wiring WIn inside tile carpet CPXn, connector CNn, and adjoining tile carpets CPXn, and return to return electrode BG of communications apparatus HTRX from return electrodes CG and WG, though the air.

In the case where communications is performed between communications apparatus HTRX and communications apparatus FTRX, it is necessary to reduce the degree of coupling between the path EB and path EG. Path EB is a path from main electrode BB of communications apparatus HTRX to main electrode FB of communications apparatus FTRX. Path EG is a path from return electrodes CG and WG provided in the ceiling and walls to return electrode BG of communications apparatus HTRX through the air. For this reason, return electrode BG is covered with an insulating layer so that that return electrode BG of HTRX does not directly contact human body HB.

Similarly, return electrodes CG of the ceiling and WG of the walls must be either covered with insulating material or disposed at locations where the electrodes does not directly contact with human body HB. It is preferable for return electrode WG to be formed in walls, for example, in the so-called "mawaridzuke" part (a horizontal member which is provided on a upper part of a wall) of the upper wall surface and in the so-called "habaki" part (a horizontal member which is provided on a lower part of a wall) of the lower part of the walls, and in the "nageshi" part (a horizontal member which is provided on a wall between two pillars), and the like. As well, it is preferable for tile carpet CPXn to have a certain degree of thickness so that human body HB does not directly contact the floor surface. Alternatively, it is preferable for the insulating layer BIS of tile carpet CPXn to have a certain thickness.

<3. Operations of a Communication System>

As shown in FIG. 13, in the case where a person (human body HB) equipped with (wearing) communications apparatus HTRX is on tile carpets CPXn, communication is performed by inducing an electric field in human body HB between communications apparatus FTRX inside tile carpets CPXn and communications apparatus HTRX. For example, when the person instructs to initiate communications by operating an operation key of communications apparatus HTRX, communications apparatus HTRX modulates the carrier wave in response to a signal that corresponds to a connection request command. Thus, communications apparatus HTRX generates a voltage difference between main electrode BB and return electrode BG based on the modulated signal and provides an electric field on human body HB.

Communications apparatus FTRX measures the voltage difference generated by main electrode FB and return electrodes CG and WG by the electric field generated on human body HB, and acquires the modulated signal used by communications apparatus HTRX in order to transmit data. Then, communications apparatus FTRX receives the data transmitted from communications apparatus HTRX, i.e., the connection request command, by demodulating the signal. This connection request command is transmitted to communications controller apparatus CCUXn. When communications controller apparatus CCUXn permits a connection, thereafter, communications between communications apparatus HTRX and communications apparatus FTRX is begun.

By this means, communications apparatus HTRX, similarly to the first embodiment, accesses the wide area network WAN through the local area network LAN and gateway server GW. Then communications apparatus HTRX can perform communications. Of course, it is possible to perform communications between two communications apparatus HTRX connected to the local area network LAN. As well, similarly to the first embodiment, communications apparatus HTRX can acquire location information from communications controller apparatus CCUXn.

Modifications of the Second Embodiment

<First Modification>

Figure 20:
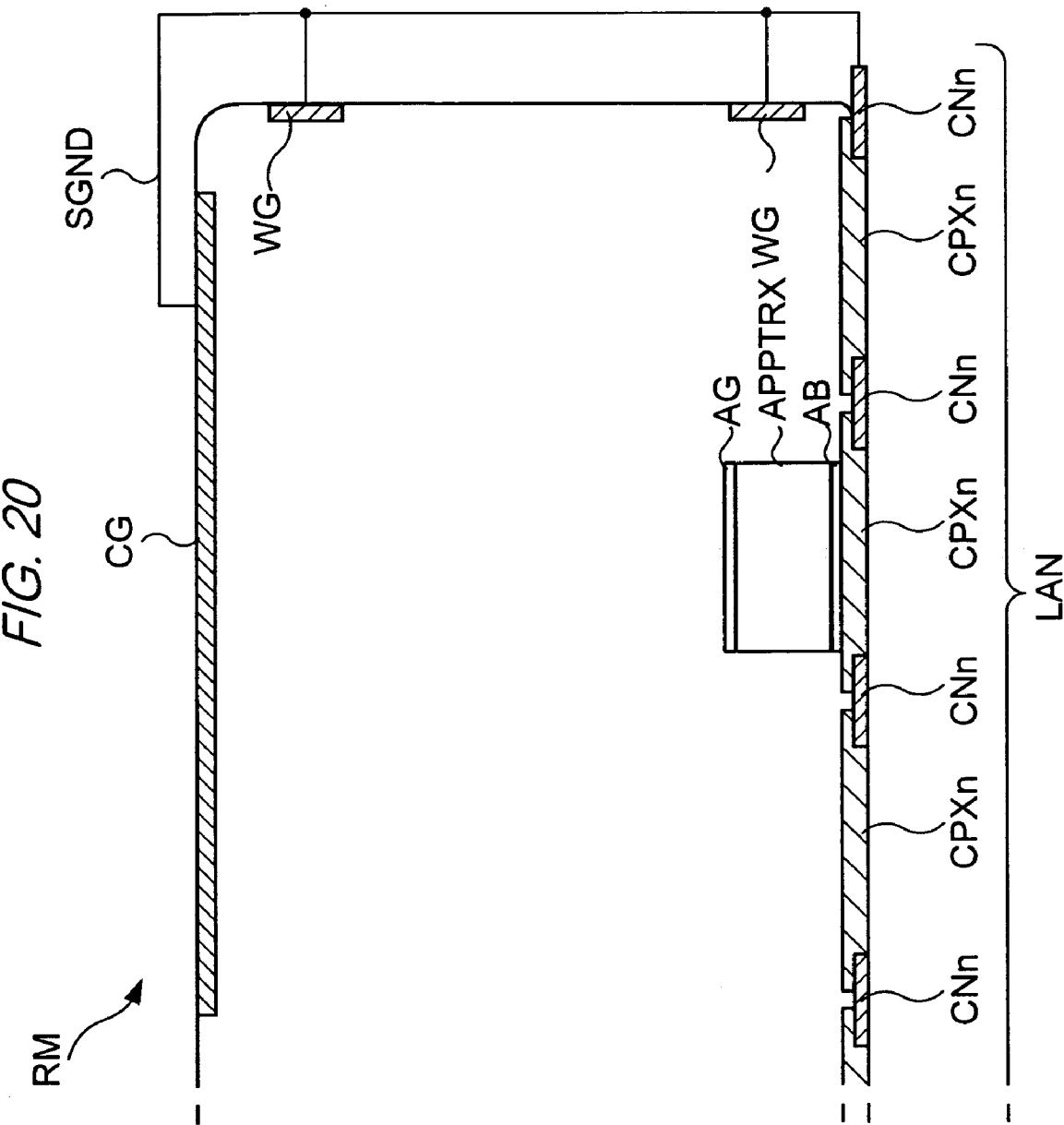
FIG. 20 shows electronic device APPTRX according to a modification of the second embodiment.

With reference to the second embodiment, a case where human body HB is used as transmission path has been explained. However, it is possible to use other dielectrics than human body HB, for example, plants and animals as transmission paths. As well, a dielectric such as a human body HB is not necessary for the present embodiment. FIG. 20 shows electronic device APPTRX having a device that performs communications using electric fields. The electronic device APPTRX is, for example, an electronic device such as a television or a personal computer, which has a cabinet covered with insulator. The cabinet has main electrode AB on the lower surface, and a return electrode AG on the upper surface. As well, the surfaces of main electrode AB and return electrode AG are both covered with an insulating layer. The electronic device APPTRX, as with communications apparatus HTRX, employs the composition shown in FIG. 19. Electric device APPTRX has functions of transmitter TX and receiver RX.

By placing the electronic device APPTRX on tile carpet CPXn, main electrode AB of electronic device APPTRX and main electrode FB of tile carpet CPXn are opposed, and it becomes possible to perform communications using electric fields. By this means, electronic device APPTRX can access the wide area network through the local area network LAN and gateway server GW, and can perform communications. Of course, it is possible to perform communications between two electric devices APPTRX connected to the local area network LAN.

Moreover, in the case of electronic device APPTRX performing communications with communications apparatus FTRX inside tile carpet CPXn, it is not necessary to restrict the carrier frequency of the carrier waves used to generate the electric field to a range of above the tens of kHz, which is preferable for good conductivity in human body HB. This is because human body HB is not used as the transmission path. In other words, one may use carrier waves having a carrier frequency lower that the above range.

<Second Modification>

For the second embodiment, communications apparatus FTRX may use multiple carrier frequencies for the carrier waves. According to the multiple carrier frequencies, the number of communications apparatus HTRX that can simultaneously communicate can be increased.

<Third Modification>

With the second embodiment, we have explained the case of establishing a return transmission path by electrostatic coupling through the air between return electrodes WG provided in the walls or return electrode CG provided in the ceiling, and return electrode BG of communications apparatus HTRX. However, between return electrode BG of communications apparatus HTRX and return electrodes CG or WG, one may establish a return path through, for example, a dielectric.

<Fourth Modification>

For the second embodiment, in order to be able to perform communications more stably, while cabinet-grounding return electrode BG of communications apparatus HTRX, ground voltage SGND is applied to return electrodes CG and WG provided in the ceiling and walls. In this way, in order to perform stable communications, it is better to apply the same electric potential to return electrode BG and return electrodes CG and WG. Accordingly, for example, return electrode BG and return electrodes CG and WG may be individually connected to signal sources having low impedance, such as a plus power supply and minus power supply, that provide the same, stabilized voltage. Alternatively, return electrode BG and return electrodes CG and WG may be separately grounded. Moreover, even if the same stabilized voltage is not applied to return electrode BG and return electrodes CG and WG, it is possible to perform communications.

<Fifth Modification>

In the second embodiment, it has been explained that communications apparatus HTRX and FTRX have transmitter and receiver devices. However, communications apparatus HTRX and FTRX may have only a transmitter device, or only a receiver device, in accordance with their application. As well, communications controller apparatus CCUXn inside tile carpet CPXn and communications apparatus FTRX may be integrated into one body.

<Sixth Modification>

In the second embodiment, although the electric field communications apparatus has both main electrodes and return electrodes, it need not have return electrodes. For example, for the configuration shown in FIG. 19, grounded cabinet CS1 may be employed instead of return electrode ESG of transmitter TX. In addition, return electrode ERG may be omitted and electrode ERT may be grounded. Communications apparatus HTRX and FTRX including transmitter TX and receiver RX having this configuration may be used.

<Seventh Modification>

In the second embodiment, the configuration of main electrode BB and return electrode BG of communication apparatus HTRX, and the configuration of main electrode FB and return electrode CG and WG of communication apparatus FTRX are interchangeable. In this case, because the polarity of the measured voltage is reversed, it is necessary to use a modulation/demodulation system unrelated to polarity such as FM. Alternatively, it is necessary for communications apparatus HTRX and communications apparatus FTRX to have polarity inverter circuits.

C. Third Embodiment

Next, description will be given for a method of detecting the location of communications apparatus HTRX with high accuracy using the communication system described in the second embodiment. Moreover, in the present embodiment, the elements in common with the second embodiment are denoted by the same reference numerals and symbols as used in the second embodiment. In addition, explanation for such elements is omitted.

Figure 21:
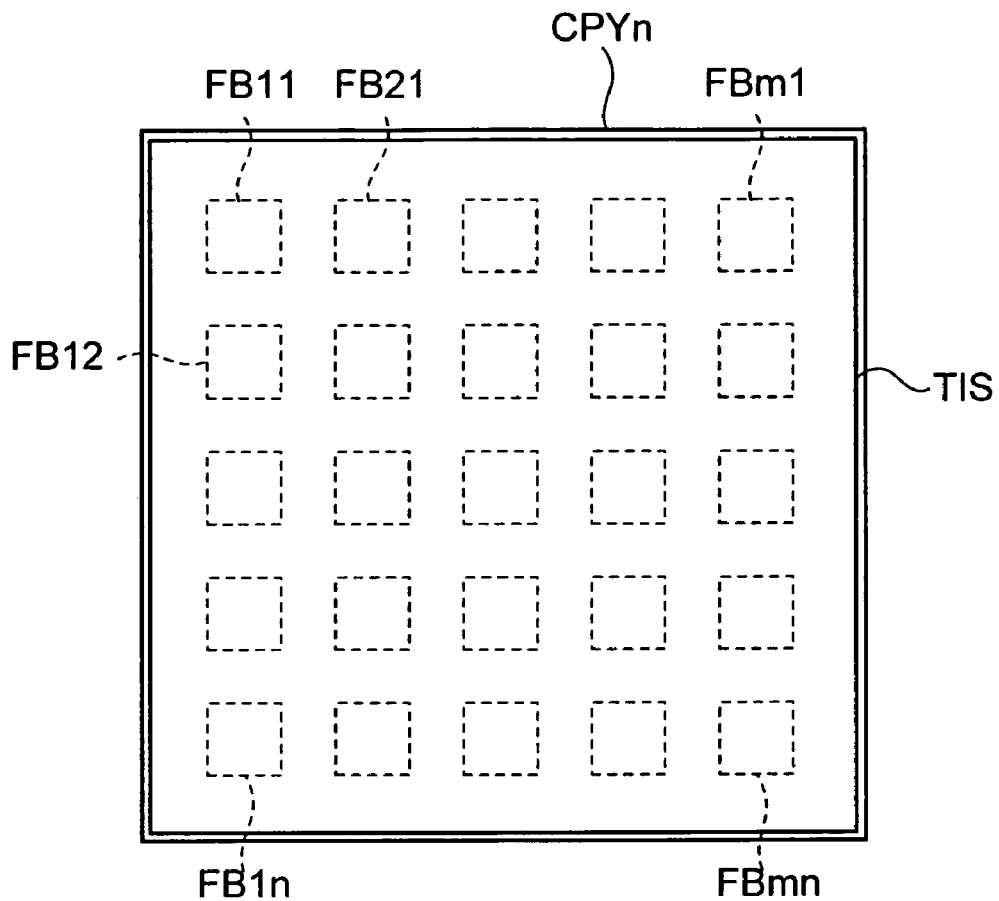
FIG. 21 shows each main electrode FBmn formed on the surface of tile carpet CPYn according to a third embodiment of the present invention.
Figure 22:
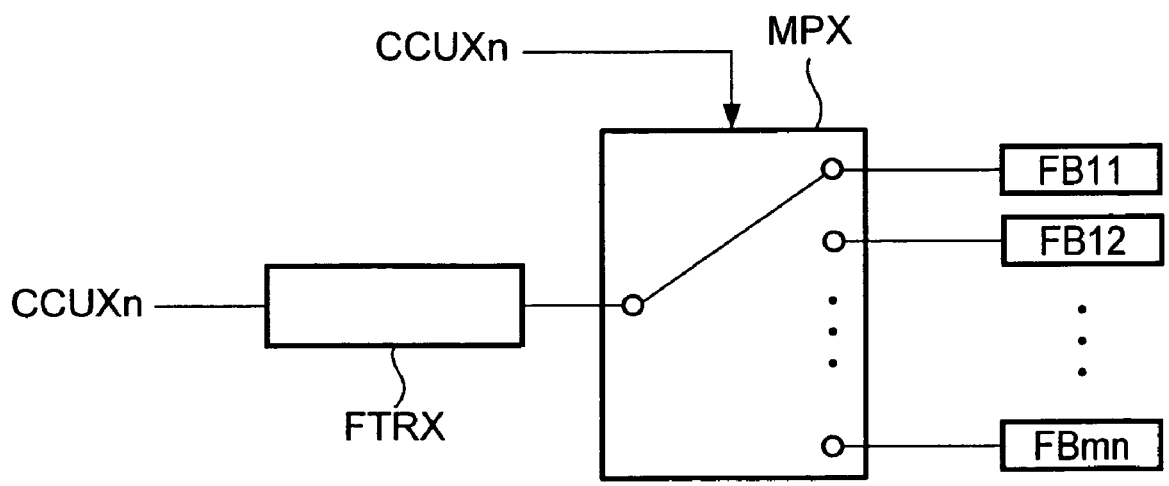
FIG. 22 shows the circuit configuration in tile carpet CPYn according to the third embodiment.

As shown in FIG. 21, an m×n matrix of main electrodes FBmn is formed on the surface of tile carpet CPYn according to the present embodiment. As well, each main electrode FBmn is covered with insulating layer TIS. Moreover, as shown in FIG. 22, each main electrode FBmn is connected to communications apparatus FTRX through a multiplexor MPX. Multiplexor MPX changes the destination of the switch in response to the exchange signal from communications controller apparatus CCUXn, and switches main electrode FBmn connected to communications apparatus FTRX. Moreover, communications may be performed between communications apparatus HTRX, worn on a person who is on tile carpet CPYn, and communications apparatus FTRX inside tile carpet CPYn. In this case, if the operation mode of communications controller apparatus CCUXn is a communications mode except for the location detection mode, communications controller apparatus CCUXn connects all main electrodes FBmn to communications apparatus FTRX, and all main electrode FBmn function as a single main electrode FB.

When communications controller apparatus CCUXn receives a command directing communications controller apparatus CCUXn to switch over to location detection mode, which is transmitted from communications apparatus HTRX via communications apparatus FTRX, communications controller apparatus CCUXn switches over to location detection mode. Moreover, communications controller apparatus CCUXn may switch over to location detection mode immediately when receiving a connection request from communications apparatus HTRX. As well, in the present embodiment, though it has been explained that communications controller apparatus CCUXn performs control related to location detection functions, communications apparatus FTRX may perform control related to location detection functions.

Figure 23:
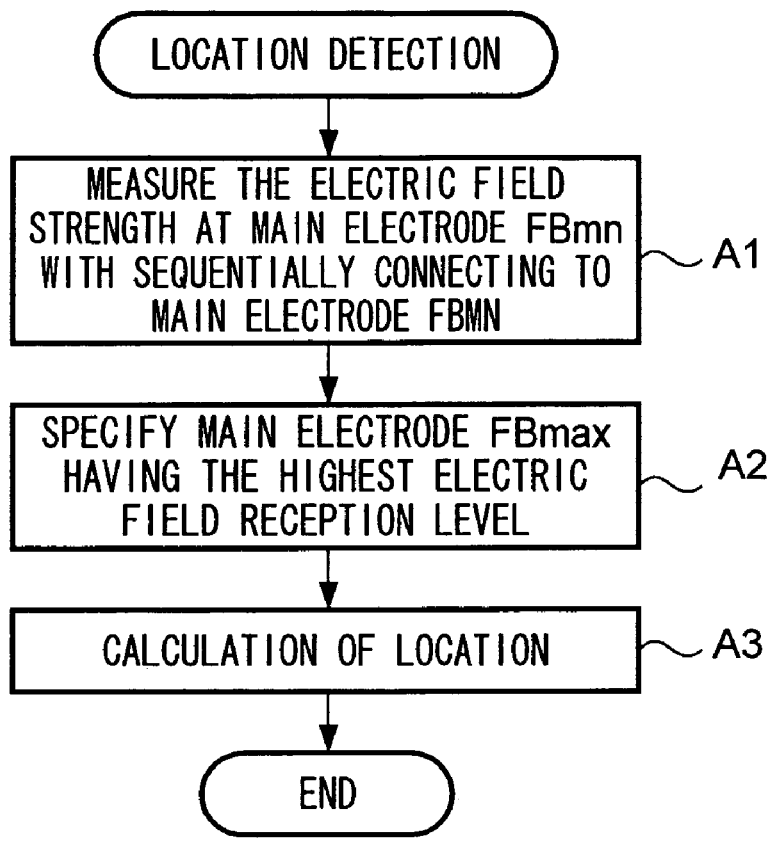
FIG. 23 is a flowchart showing the operations of location detection executed in communications control apparatus CCUXn of tile carpet CPYn according to the third embodiment.

As shown in FIG. 23, in location detection mode, first, communications controller apparatus CCUXn transmits a switch-over signal to multiplexor MPX. Thus, communications controller apparatus CCUXn controls multiplexor MPX to switch main electrode FBmn one by one from main electrode FB11, the selected main electrode FBmn being connected to communications apparatus FTRX. As well as the above described operation, communications controller apparatus CCUXn performs testing operations on the communications apparatus HTRX using communications apparatus FTRX, and causes communication apparatus FTRX to measure the electric field strength at main electrode FBmn (hereinafter, referred to as "electric field reception level"), of response signal from communications apparatus HTRX, for each main electrode FBmn. As well, communications controller apparatus CCUXn stores (step A1) in nonvolatile memory 106 the measured result of each main electrode FBmn.

Next, communications controller apparatus CCUXn specifies (step A2) main electrode FBmax from which the highest electric field reception level was measured, based on the measured result of each main electrode FBmn stored in nonvolatile memory 106. Then, communications controller apparatus CCUXn calculates (step A3) the location of main electrode FBmax.

For example, control information storage table 106a of the present embodiment (see FIG. 10) stores information indicating location of main electrode FBmn among the tile carpet CPYn for each main electrode FBmn, in addition to location information indicating the location of the center of tile carpet CPYn (e.g., latitude, longitude, elevation). Communications controller apparatus CCUXn acquires the location of main electrode FBmax by reading out from control information storage table 106a the location information of tile carpet CPYn and information indicating the location of main electrode FBmax. Then, communications controller apparatus CCUXn assumes that the location of communications apparatus HTRX is the same as the location of main electrode FBmax.

After this, communications controller apparatus CCUXn transmits the acquired location information to communications apparatus HTRX, using communications apparatus FTRX. In this way, it becomes possible for the local area network LAN to provide to communications apparatus HTRX high accuracy location information, by the size of main electrode FBmn.

Modifications of the Third Embodiment

<First Modification>

In the third embodiment, the location may be determined by using not only main electrode Fbmax but also a plurality of main electrodes Fbmn, the plurality of main electrodes Fbmn being specified in order of descending electric field reception level. In this case, it is preferable that a center of gravity be determined by locations of the specified plurality of main electrodes FBmn. As well, in the case of acquiring the location from the specified plurality of main electrodes FBmn, this may be done to perform a weighting in response to the electric field reception level of each specified main electrode FBmn. Alternatively, determination of the location may be performed by further taking into consideration an error rate of test communications for each main electrode FBmn. In this way, it becomes possible to provide location information to communications apparatus HTRX with higher accuracy. As well, in such cases as when communications apparatus HTRX is located to straddle several main electrodes FBmn, and also in such cases where communications apparatus HTRX is located between two main electrodes FBmn, it is possible to more accurately acquire a location of communications apparatus HTRX. As well, in the case of electronic device APPTRX shown in FIG. 20 is possible to determine the location with the method used for communications apparatus HTRX.

<Second Modification>

In the third embodiment, each main electrode FBmn formed on tile carpet CPYn need not be restricted to being arranged as a matrix as shown if FIG. 21. As well, similarly to the second embodiment, it is not necessary for each main electrode FBmn to be covered with insulating layer TIS.

<Third Modification>

In the third embodiment, multiplexor MPX may be installed in communications apparatus FTRX. Alternatively, in tile carpet CPYn, functions of communications controller apparatus CCUXn, communications apparatus FTRX, and multiplexor MPX may be integrated in one device.

D. Fourth Embodiment

Next, description will be given for methods to detect the direction in addition to the location of electronic device APPTRX for the communication system described in the third embodiment. The description will be given for the cases, for example, in the case of main electrode AB touching the surface of tile carpet CPYn as shown in FIG. 20, and in the case where main electrode AB is in a sufficiently close vicinity though not in contact with the surface of tile carpet CPYn. In the present embodiment, the same reference numerals and symbols are used to denote elements in common with the third embodiment, and description of such elements is omitted.

First, in the present embodiment, tile carpet CPYn described in the third embodiment (see FIG. 21 and FIG. 22) is employed. In other words, on the surface of tile carpet CPYn, an m×n matrix of main electrode FBmn is arranged, and each main electrode FBmn is covered with insulating layer TIS. As well, each main electrode FBmn is connected to communications apparatus FTRX through multiplexor MPX.

Figure 24:
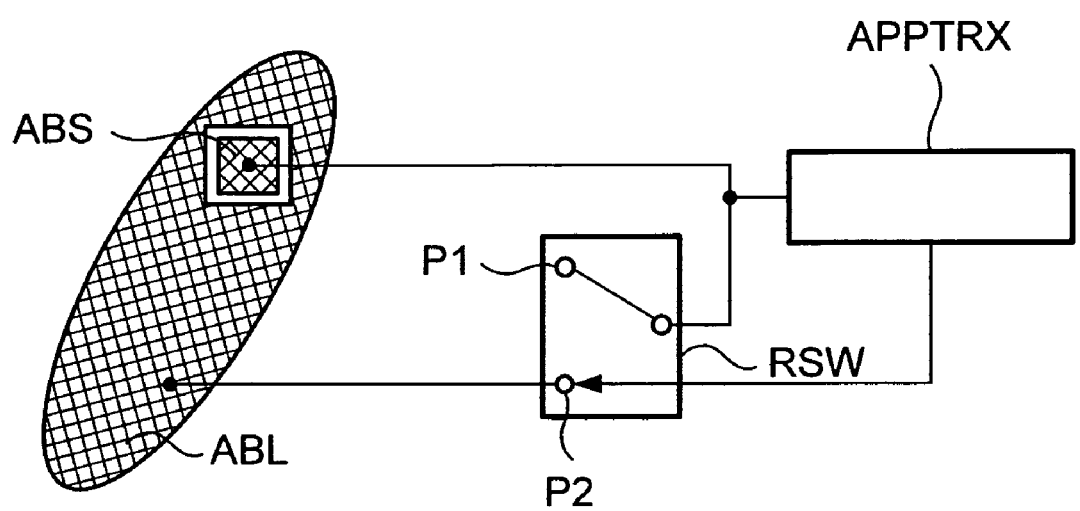
FIG. 24 shows the configuration of electronic device APPTRX according to a fourth embodiment of the present invention.

As well, two main electrodes ABS and ABL are provided on the lower surface of electronic device APPTRX according to the present embodiment as shown in FIG. 24. Electronic device APPTRX can perform communications with communications apparatus FTRX with only main electrode ABS being available, by connecting switch RSW to P1. Moreover, in a case of an ordinary communications mode except for location/direction detection mode, electronic device APPTRX performs communication with communications apparatus FTRX with main electrode ABS and main electrode ABL being available (that is, assuming the entirety of the main electrodes are available) by connecting switch RSW to P2.

Communications controller apparatus CCUXn inside tile carpet CPYn switches its operation mode to location/direction detection mode, for example, in such cases where communications controller apparatus CCUXn receives a command directing a change to location/direction detection mode. Of course, communications controller apparatus CCUXn may switch its operation mode to location/direction detection mode immediately when receiving a connection request from electronic device APPTRX.

Figure 25:
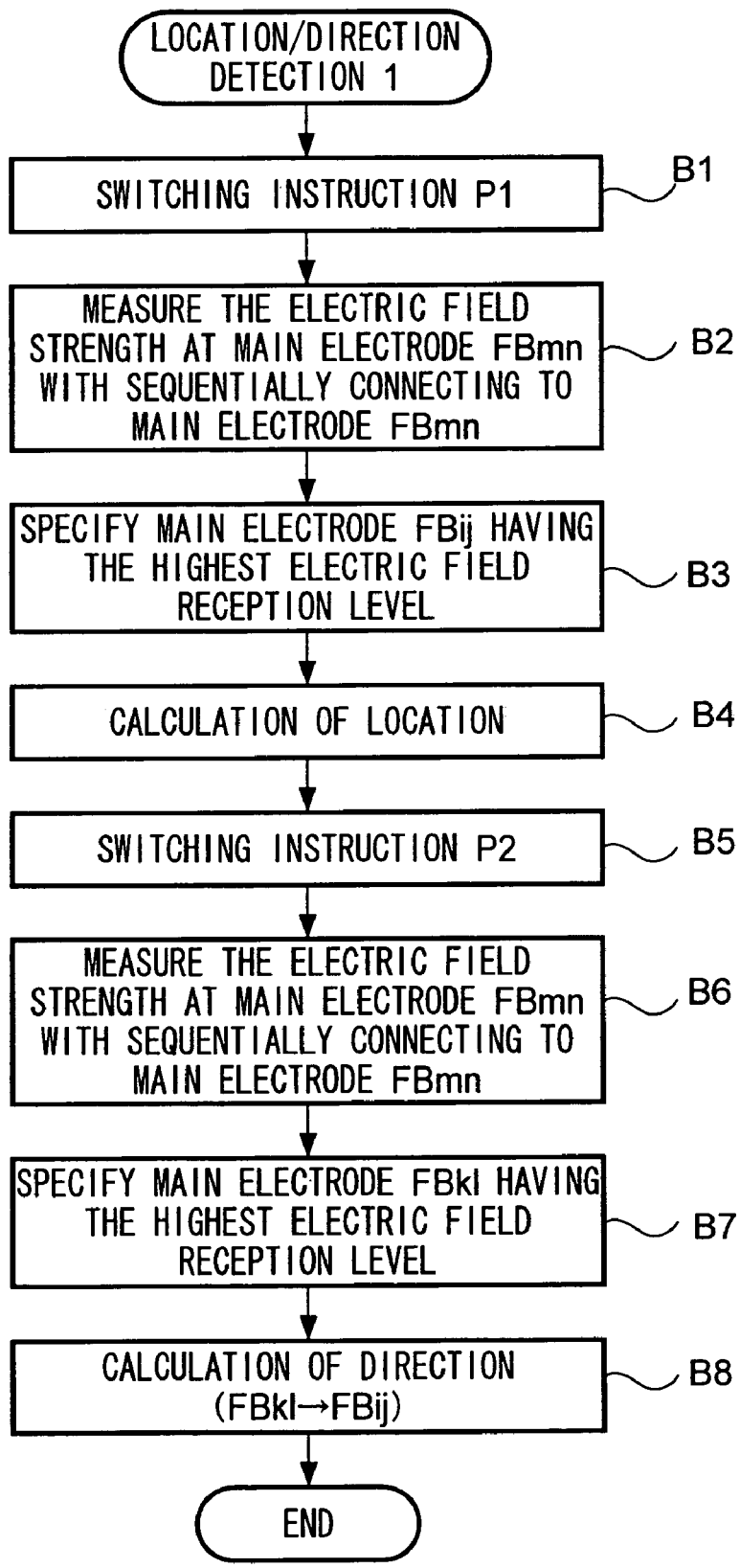
FIG. 25 is a flowchart showing the operations for location/direction detection executed in communications control apparatus CCUXn of tile carpet CPYn according to the fourth embodiment.
Figure 26:
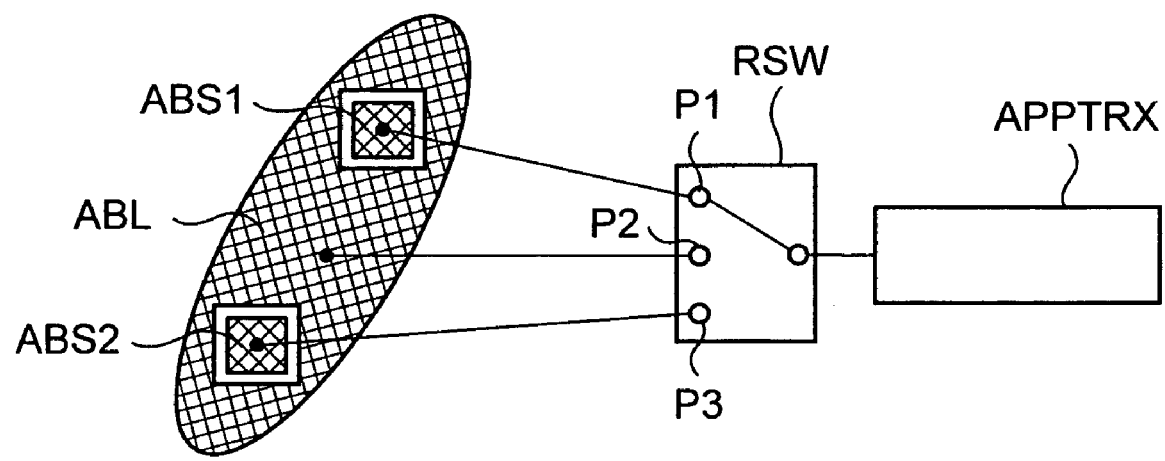
FIG. 26 shows another example of the configuration of electronic device APPTRX according to the same preferred embodiment.

As shown in FIG. 25, for location/direction detection mode, first, communications controller apparatus CCUXn transmits (step B1) to electronic device APPTRX a command showing an instruction to switch the switch RSW to P1, using communications apparatus FTRX. In response to the command, electronic device APPTRX connects switch RSW to P1, and only main electrode ABS is available. Then, communications controller apparatus CCUXn performs (steps B2-B4) operations similar to steps A1 to A3 of the location detection operations shown in FIG. 23, and determines the location of main electrode ABS of electronic device APPTRX. Here, main electrode FBij is assumed to be main electrode FBmax which has the highest measured electric field reception level in step B3.

After this, communications controller apparatus CCUXn transmits a command directing electronic device APPTRX to connect switch RSW to P2 (step B5), using communications apparatus FTRX. By this means, electronic device APPTRX connects switch RSW to P2, and therefore main electrode ABS and main electrode ABL, i.e., the entirety of the main electrodes, are available. Next, communications controller apparatus CCUXn performs (steps B6 and B7) operations similar to steps A1 and A2 of the location detection operations shown in FIG. 23, and specifies main electrode FBmax having the highest measured electric field reception level, in the case where the entirety of the main electrodes of electronic device APPTRX are available. Moreover, here, for step B7, main electrode FBkl is assumed to be main electrode FBmax having the highest measured electric field reception level.

Then, communications controller apparatus CCUXn computes (step B8) the direction vector toward main electrode FBij from main electrode FBkl, based on main electrode FBij and main electrode FBkl. After this, communications controller apparatus CCUXn transmits to electronic device APPTRX the direction information acquired in step B8 and the location information acquired in step B4, using communications apparatus FTRX.

Thus, local area network LAN can also provide direction information to electronic device APPTRX, in addition to highly accurate location information. Of course, local area network LAN can transmit location information and direction information of electronic device APPTRX to communications devices other than electronic device APPTRX. By this means, the user can know the direction in which the front of electronic device APPTRX is facing, in addition to the location of electronic device APPTRX.

As well, if control information storage table 106a of communications controller apparatus CCUXn (see FIG. 10) includes location information that indicates latitude and longitude, it is able to acquire a compass point from two locations (main electrode FBij and main electrode FBkl). Thus, for example, it becomes able to display on the screen of electronic device APPTRX the information that electronic device APPTRX faces south-southwest, and the like. Furthermore, it is possible to more accurately sense the direction, by using three main electrodes ABS1, ABS2, and ABL. In this case, a direction vector can be obtained based on the locations of ABS1 and ABS2.

E. Fifth Embodiment

Next, another method for detecting the location and direction using the communication system in the third embodiment will be explained. Moreover, for the present embodiment, the same reference numerals and symbols are used to denote elements in common with the third embodiment, and explanation of such elements is omitted.

Figure 27:
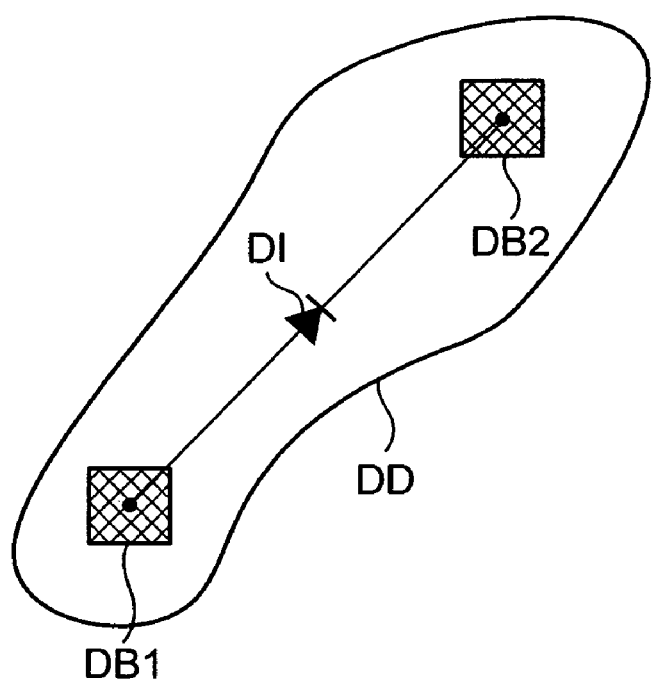
FIG. 27 shows electrodes DB1 and DB2, and directional coupling element DI, formed in the sole DD of a shoe, for a fifth embodiment of the present invention.

In the present embodiment, two electrodes DB1 and DB2 are provided on one of a shoe sole DD worn by a person (human body HB), who wears communications apparatus HTRX, as shown in FIG. 27. A directional combining element such as a diode or the like, is connected between two electrodes DB1 and DB2. With the example shown in FIG. 27, electrode DB1 is provided in a part of the heel of the shoe sole DD, and electrode DB2 is provided in a part before the toe.

Figure 28:
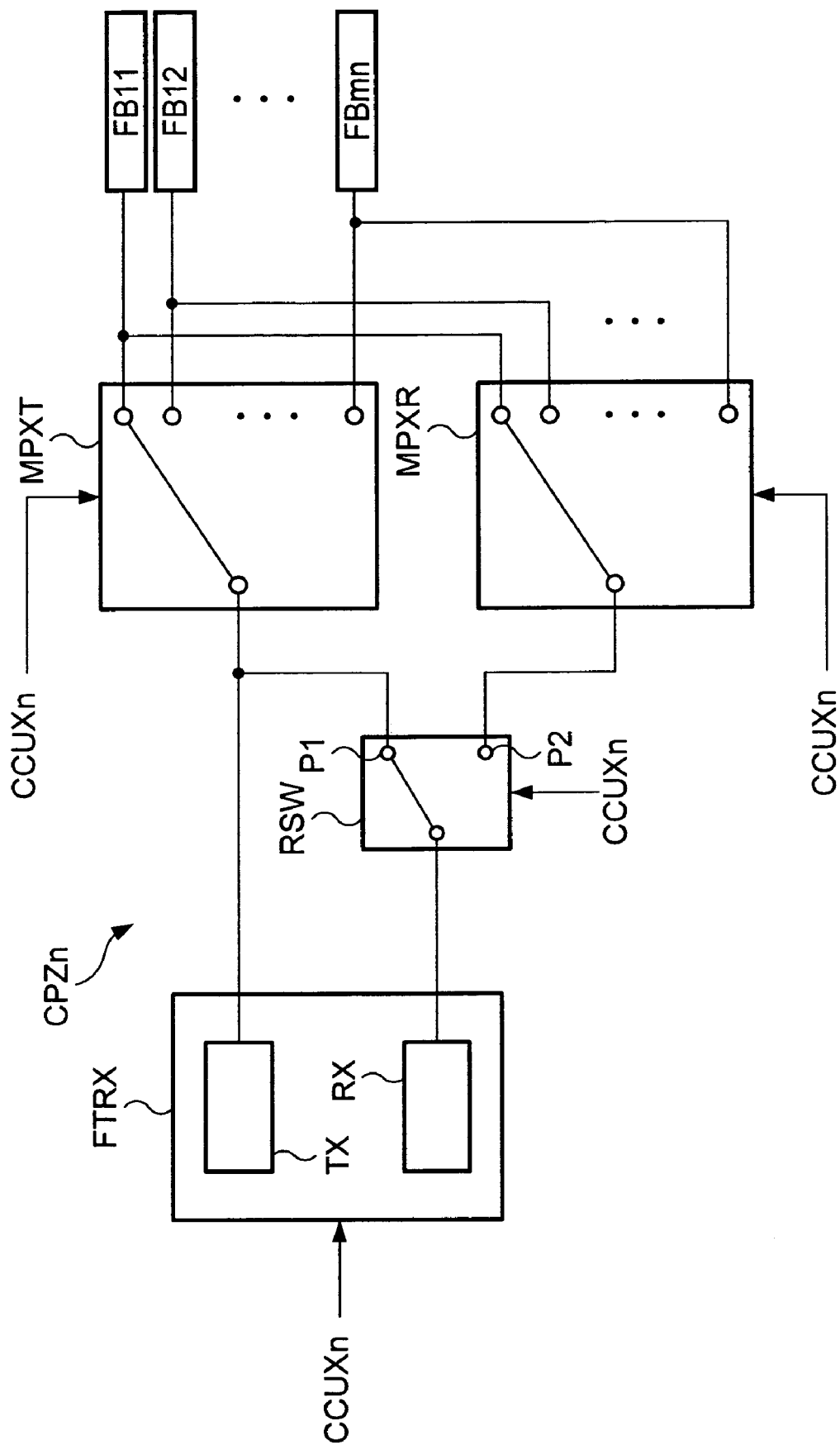
FIG. 28 shows the circuit configuration of a tile carpet CPZn according to the fifth embodiment.

As well, as shown in FIG. 28, each main electrode FBmn is connected to transmitter TX and receiver RX of communications apparatus FTRX through two multiplexors (multiplexor MPXT and multiplexor MPXR) and switch RSW. Moreover, in the present embodiment, main electrodes FBmn are laid out in m×n matrix on the surface of tile carpet CPZn as shown in FIG. 21. The surface of each electrodes FBmn is covered with an insulating layer TIS. As well, multiplexor MPXT, multiplexor MPXR, and switch RSW change the destination of the switch in response to switchover signals from communications controller apparatus CCUXn.

Here, description will be given for a case of, for example, performing communications between communications apparatus HTRX worn by a person who is on tile carpet CPXn and communications apparatus FTRX inside tile carpet CPZn. In ordinary communications other than location/direction detection mode, communications controller apparatus CCUXn connects switch RSW to P1. Further, communications controller apparatus CCUXn connects all of the main electrodes FBmn to transmitter TX and receiver RX, and uses the main electrodes as a single main electrode FB. When receiving a command directing communications controller apparatus CCUXn to switch over to location detection mode, which is transmitted from communication apparatus HTRX, communications controller apparatus CCUXn switches its operation mode to location/detection mode. Moreover, communications controller apparatus CCUXn may switch over to location/detection mode immediately in response to a connection request from communications apparatus HTRX.

Figure 29:
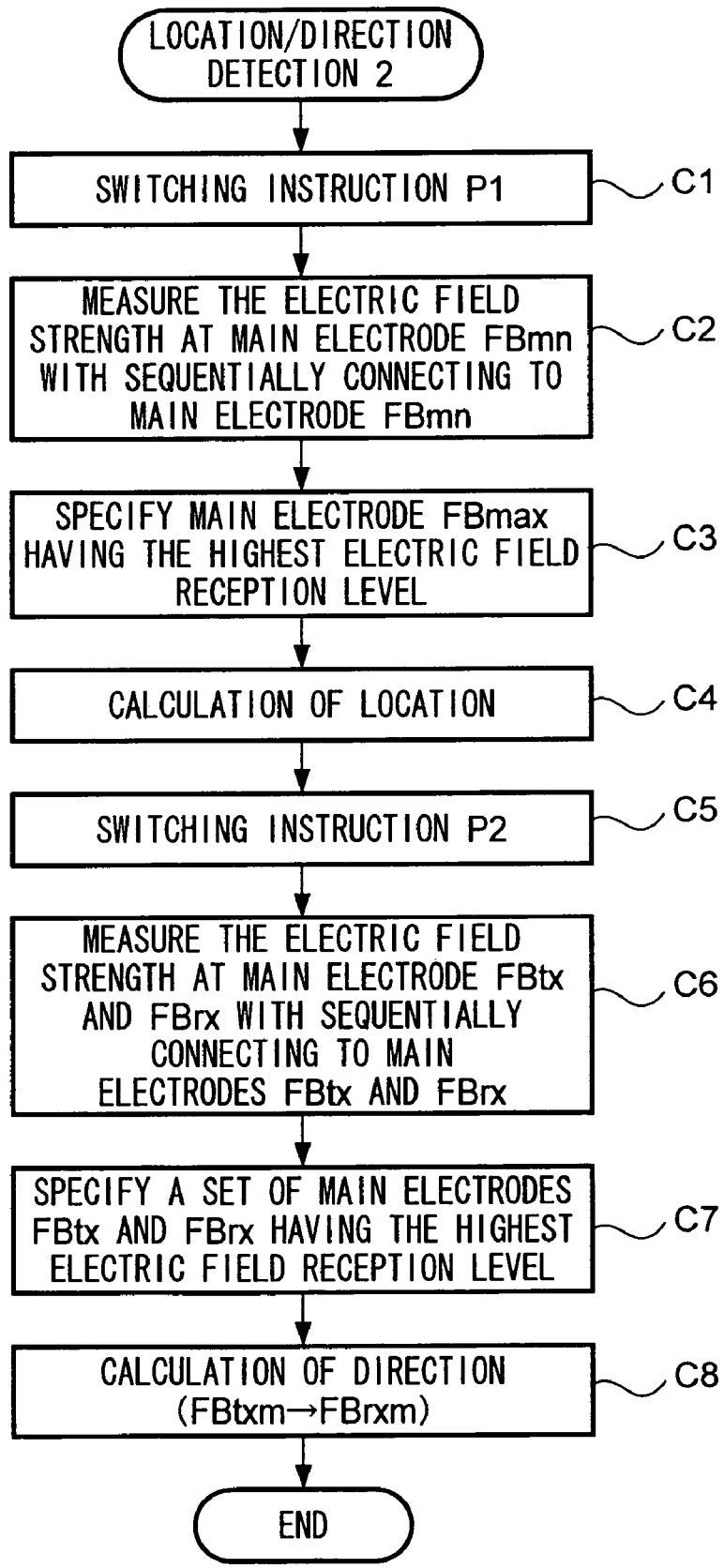
FIG. 29 is a flowchart showing the operations of location/direction detection executed by communications controller apparatus CCUXn of tile carpet CPZn according to the fifth embodiment.

As shown in FIG. 29, for location/direction detection mode, first, communications controller apparatus CCUXn connects (step C1) switch RSW to P1. Next, in following steps C2 through C4, communications controller apparatus CCUXn detects the location of communications apparatus HTRX, by operations similarly to steps A1 through A3 of the location detections operations shown in FIG. 23 with multiplexor MPXT.

In other words, communications controller apparatus CCUXn transmits switchover signals to multiplexor MPXT, and thus, the main electrodes FBmn are connected from main electrode FB11, sequentially, one by one, to transmitter TX and receiver RX. As well, at the same time as this, communications controller apparatus CCUXn performs test communications between communications apparatus HTRX using communications apparatus FTRX. Communications controller apparatus CCUXn controls (step C2) each main electrode FBmn to measure the electric field reception level of the response signal from communications apparatus HTRX in receiver RX. As well, from among the measured results from each main electrode FBmn, communications controller apparatus CCUXn determines (step C3) the main electrode FBmax with the highest electric field reception level. Then, communications controller apparatus CCUXn acquires (step C4) the location of main electrode FBmax. Moreover, in the case of acquiring the location of communications apparatus HTRX, similarly to the third embodiment, communications controller apparatus CCUXn may determine several main electrodes FBmn consecutively from the one that has the highest electric field reception level, rather than using only main electrode FBmax. Communications controller apparatus CCUXn may acquire the locations of the several main electrodes FBmn.

After this, communications controller apparatus CCUXn connects (step C5) switch RSW to P2. Thus, communications controller apparatus CCUXn becomes able to separately control main electrode FBmn connected to transmitter TX and the main electrode FBmn connected to receiver RX, using the two multiplexors MPXT and MPXR. Moreover, in the below description, main electrode FBrnn connected to transmitter TX is referred to as main electrode FBtx, and main electrode FBmn connected to receiver RX is referred to as main electrode FBrx.

First, communications controller apparatus CCUXn switches main electrode FBrx, which is connected to receiver RX sequentially one by one from main electrode FB11 to FBmn using multiplexors MPXT and MPXR, each time it switches over main electrode FBtx, which is connected to transmitter Tx sequentially one by one from FB11. As well, communications controller apparatus CCUXn transmits a test signal from transmitter TX and controls receiver RX to measure the electric field reception level, at the time switching over main electrode FBrx. However, in the case where main electrode FBrx to be measured the electric field reception level is FBtx transmitting the test signal, the electric field reception level is not measured. Then, communications controller apparatus CCUXn stores (step C6) the electric field reception level measurement result in nonvolatile memory 106 in correspondence with the identifiers of main electrode FBtx and main electrode FBRx to be measured.

To explain specifically, communications controller apparatus CCUXn first connects main electrode FB11 to transmitter TX. Then, communications controller apparatus CCUXn switches main electrode FBrx connected to receiver RX consecutively from main electrode FB12 over to main electrode FBmn, with main electrode FB11 being connected to transmitter TX. As well, communications controller apparatus CCUXn transmits a test signal from main electrode FB11 presently connected to main electrode FB11, and measures the electric field reception level using the main electrode FBrx presently connected to receiver RX. Thus, when the main electrode FBrx connected to receiver RX reaches main electrode FBmn, communications controller apparatus CCUXn then connects main electrode FB12 to transmitter TX. After this, communications controller apparatus CCUXn transmits a test signal from transmitter TX, and controls receiver RX to measure the electric field reception level, while switching over from main electrode FB11 to main electrode FBmn except for main electrode FB12.

Now, on shoe sole DD of the person who wears communications apparatus HTRX, the two electrodes DB1 and DB2 are connected via directional coupling element DI, as shown in FIG. 27. Accordingly, in a case where the main electrode FBtx to which the test signal was transmitted is nearest to electrode DB1, and also in the case where the main electrode FBrx connected to receiver RX is closest to electrode DB2, the electric field reception level measured by receiver RX becomes the highest value.

Communications controller apparatus CCUXn determines (step C7) the combination of main electrode FBtx and main electrode FBrx that had the highest electric field reception level. Moreover, for the determined combination of main electrode FBtx and main electrode FBrx, main electrode FBrxm and main electrode FBtx are represented FBrxm and FBtxm, respectively. Communications controller apparatus CCUXn computes (step C8) the direction vector, which directs from main electrode FBtxm to main electrode FBrxm based on main electrode FBtxm and main electrode FBrxm. Thus, the information about the direction from electrode DB1 provided in the heel part of shoe sole DD to electrode DB2 provided in the toe part is acquired. After this, communications controller apparatus CCUXn transmits to communications apparatus HTRX the location information acquired in step C4 and the direction information acquired in step C8, using communications apparatus FTRX.

According to the operation above, local area network LAN can provide to communications apparatus HTRX this direction information, in addition to highly accurate location information. Thus, the user of communications apparatus HTRX can acquire information related to his/her direction. Of course, it is possible to transmit location and direction information of communications apparatus HTRX to communications devices other than communications apparatus HTRX. As well, it is not necessary to have a power source for the parts (directional coupler element DI and electrodes DB1 and DB2.) used in direction location installed in shoe sole DD.

Furthermore, similarly to the fourth embodiment, if there is data that indicates latitude and longitude in the location information recorded in the control information storage table 106a (see FIG. 10), it is possible to acquire compass points from two locations (main electrode FBtxm and main electrode FBrxm). Thus, it becomes possible to display on the screen of communications apparatus HTRX information showing, for example, the user is pointing in the direction south-southwest.

Modifications of the Fifth Embodiment

<First Modification>

In the fifth embodiment, a case is disclosed of providing directional coupling element DI and electrodes DB1 and DB2 formed in only one sole DD of a pair of shoes. However, directional coupling elements DI, and electrodes DB1 and DB1 may be provided in shoe soles DD of both the left foot and the right foot. In this case, communications controller apparatus CCUXn computes the direction facing the heel and the toe based on the respective left foot and right foot. Then, communications controller apparatus CCUXn assumes the direction of the user by, for example, computing the average of the left foot and the right foot. Alternatively, communications controller apparatus CCUXn may assume the direction of the user by computing with weighting, with the direction of the right foot being, for example, 75% of the weight, and that of the left foot 25%.

<Second Modification>

In the fifth embodiment, communications controller apparatus CCUXn may compute the location of the person wearing these shoes, using only electrodes DB1 and DB2 provided in shoe sole DD. In this case, communications controller apparatus CCUXn performs the operations following step 5 in the above mentioned direction/location detection operations. Then, communications controller apparatus CCUXn first specifies the combination of main electrode FBtx and main electrode FBrx corresponding to the highest measured electric field reception level. Moreover, here, for the determined combination of main electrode FBtx and main electrode FBrx, main electrode FBtx and FBrx are referred to as FBtxm and FBrxm, respectively.

Next, similarly to the case of the third embodiment, communications controller apparatus CCUXn computes the location of main electrode FBtxm and main electrode FBrxm based on the location information in the control information storage table 106a indicating the location of the center of this tile carpet CPZn (e.g., latitude, longitude, elevation), and on information indicating the location of each main electrode FBmn in the tile carpet CPZn. Then, communications controller apparatus CCUXn computes the location of the person wearing the shoes, based on the location of main electrodes FBtxm and FBrxm. For example, communications controller apparatus CCUXn determines as location of the person the central point of a straight line linking the two central locations of main electrode FBtxm and main electrode FBrxm.

At this time, for example, communications controller apparatus CCUXn may compute the location of the person, using weighting, for example, 75% for main electrode FBtxm and 25% for main electrode FBrxm. Here, the location of main electrode FBtxm is equal to the location of electrode DB1 provided in the heel part of shoe sole DD. The location of main electrode FBrxm is equal to the location of electrode DB2 provided in the toe part of shoe sole DD.

Furthermore, it is possible to compute the location of the person wearing these shoes with greater accuracy if shoe soles DD for both left foot and right foot are provided with directional coupling elements DI and electrodes DB1 and DB2. In this case, first, communications controller apparatus CCUXn computes the locations of main electrode FBtxm and main electrode FBrxm based on the respective shoes for left foot and right foot. Here, for the shoe on the right foot, main electrode FBtxm is referred to as main electrode FBtxm-r, and main electrode FBrxm is referred to as main electrode FBrxm-r. Similarly, for the shoe on the left foot, main electrode FBtxm is referred to as main electrode FBtxm-1 and main electrode FBrxm is referred to as main electrode FBrxm-1.

Then, communications controller apparatus CCUXn computes the location of the person wearing these shoes based on four computed locations of main electrode FBtxm-r, main electrode FBrxm-r, main electrode FBtxm-1, and main electrode FBrxm-1. Here, there are various ways of computing the location; for example, it is possible for communications controller apparatus CCUXn to take as the location of the person the central location of the square shape assuming that the locations of the four places are the corners.

<Third Modification>

In the fifth embodiment, any two or more main electrodes FBmn arranged on the surface of tile carpet CPZn will become conductive with electrodes DB1 and DB2 provided on the surface of the shoes, in the case that the surface of each main electrode FBmn formed on the surface of tile carpet CPZn is not covered with insulating layer TIS, and that the electrodes DB1 and DB2 are formed on the underside of the shoes, facing to the ground. According to such a configuration, communications controller apparatus CCUXn can compute the person's location and direction by measuring the voltage of main electrode FBrx when a voltage is applied to main electrode FBtx, instead of measuring the electric field reception level in the flowchart of location/direction detection operations shown in FIG. 29.

<Fourth Modification>

In the fifth embodiment, directional coupler element DI and electrodes DB1 and DB2 may be provided on, for example, on socks, or on footwear like slippers and sandals, instead of shoes. For the purpose of the present invention, directional coupler element DI and electrodes DB1 and DB2 may be provided in parts which touches the surface of tile carpet CPZn or used near the surface. As well, the parts on which directional coupler element DI and electrodes DB1 and DB2 are provided may be a belt or strap on the user's ankle or footwear.

As well, for electronic device APPTRX shown in FIG. 20, if directional coupler element DI and electrodes DB1 and DB2 are formed on this lower surface, it is possible to detect the location and direction using the method described for the present embodiment. Furthermore, if the two electrodes DB1 and DB2 connected to directional coupling element DI are formed on the lower surfaces of products such as home appliances, office equipment and furniture, it is possible to detect the locations and directions of products using the method described for the present embodiment.

F. Sixth Embodiment

Next, an explanation will be given for methods to charge the electronic devices, using the communications system in the second embodiment. Moreover, for the present embodiment, the same reference numerals and symbols are used to denote elements in common with the second embodiment, and explanation of such elements is omitted.

Figure 30:
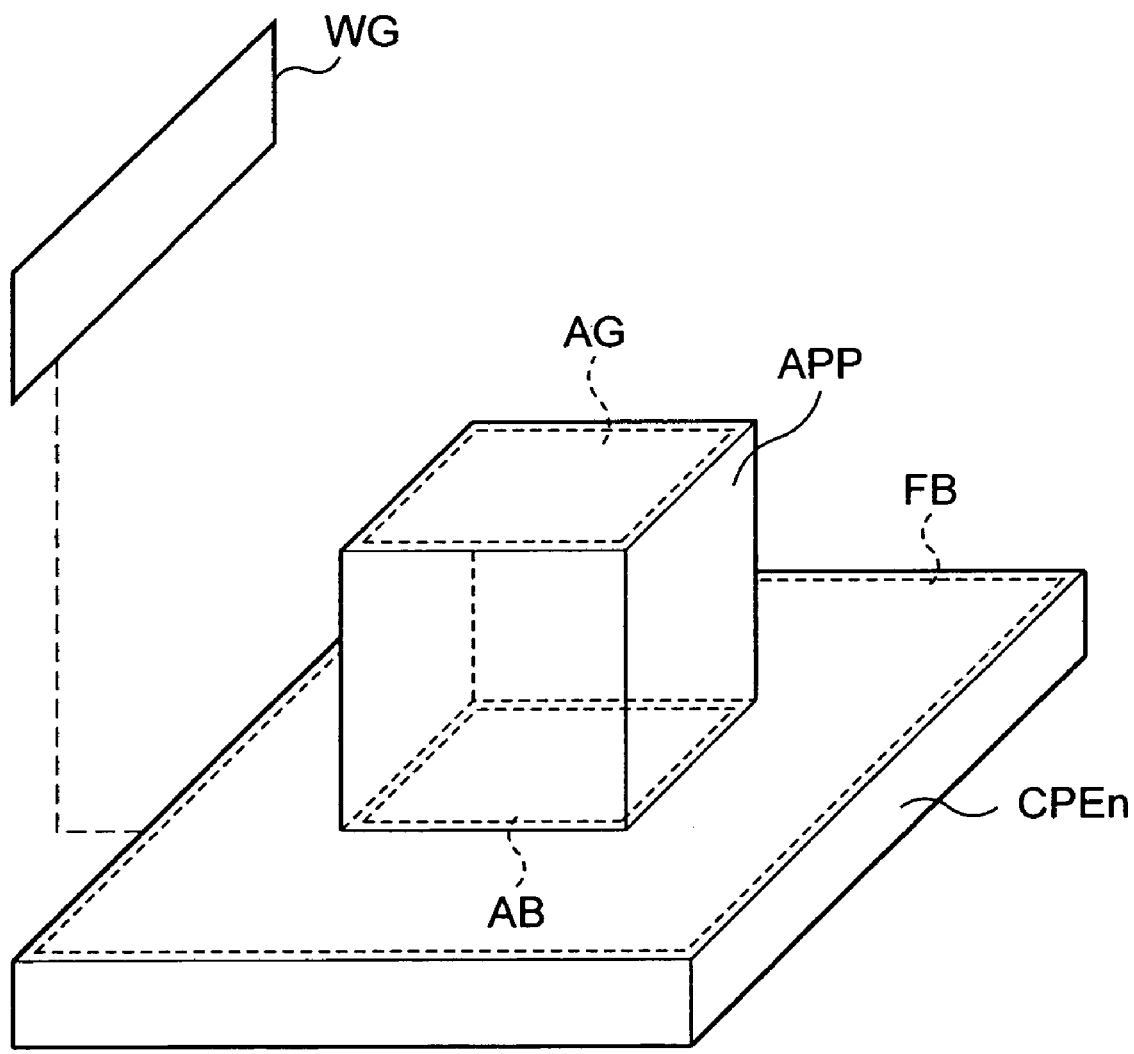
FIG. 30 shows an electronic device APP with a tile carpet CPEn according a sixth embodiment of the present invention.

In tile carpet CPEn according to the present embodiment main electrodes FB are provided on a surface as shown in FIG. 30. The surfaces of these main electrodes are covered with an insulating layer. As well, communications apparatus FTRX installed in tile carpets CPEn is connected to return electrodes WG formed on the walls of the room. Electronic device APP may be an electronic information device such as a television or a personal computer. These electronic devices APP have main electrodes AB on the lower surface, and return electrodes AG on the upper surface. These main electrodes AB and return electrodes AG have their surfaces covered with an insulating layer.

Figure 31:
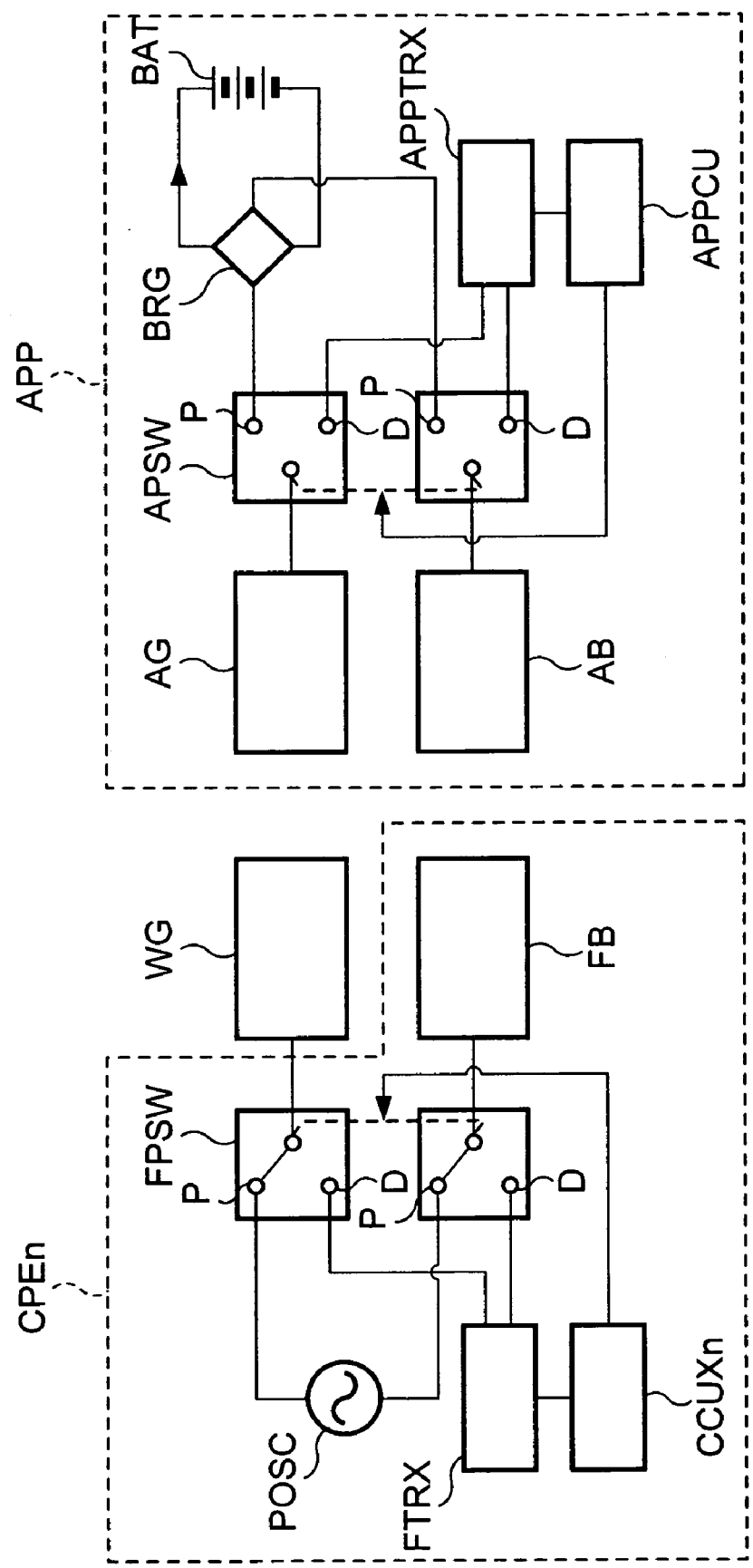
FIG. 31 shows the circuit configuration of an electronic device APP with a tile carpet CPEn according to the sixth embodiment.

Next, as shown in FIG. 31, tile carpet CPEn has communications controller apparatus CCUX, communications apparatus FTRX, oscillator POSC, and partition switches FPSW. As well, electronic device APP has control part APPCPU that controls each part of said electronic device APP, communications apparatus APPTRX, partition switch APSW, rectification circuit BRG, and rechargeable battery BAT.

Communications control apparatus CCUX involved in tile carpet CPEn switches over to charge mode, in such cases as communications control apparatus CCUX receives a command indicating a switchover to charge mode transmitted from electronic device APP. In charge mode, first, communications control apparatus CCUXn transmits to partition switch FPSW a switchover signal. Thus, both of partition switches FPSW are connected to P. In electronic device APP, both of partition switches APSW are also connected to P under the control of control part APPCPU. Moreover, an operation button for controlling the switchover of partition switch FPSW may be provided on the surface of tile carpet CPEn. In this case, a user may operate the operation button for controlling the switchover of partition switch FPSW.

Then, communications controller apparatus CCUXn generates an AC voltage for charging of electronic device APP, by oscillator POSC. In this way, through main electrode FB and return electrodes WG, an AC voltage is induced between main electrode AB and return electrode AG of electronic device APP. In electronic device APP, the battery is charged by rectifying the AC voltage using rectifier circuit BRG and getting a DC voltage. In the case of communications mode, all of partition switch FPSW of tile carpet CPEn and partition switch APSW of electronic device APP are connected to D.

Thus, communications can be performed using an electric field between communications apparatus FTRX and communications apparatus APPTRX.

Figure 32:
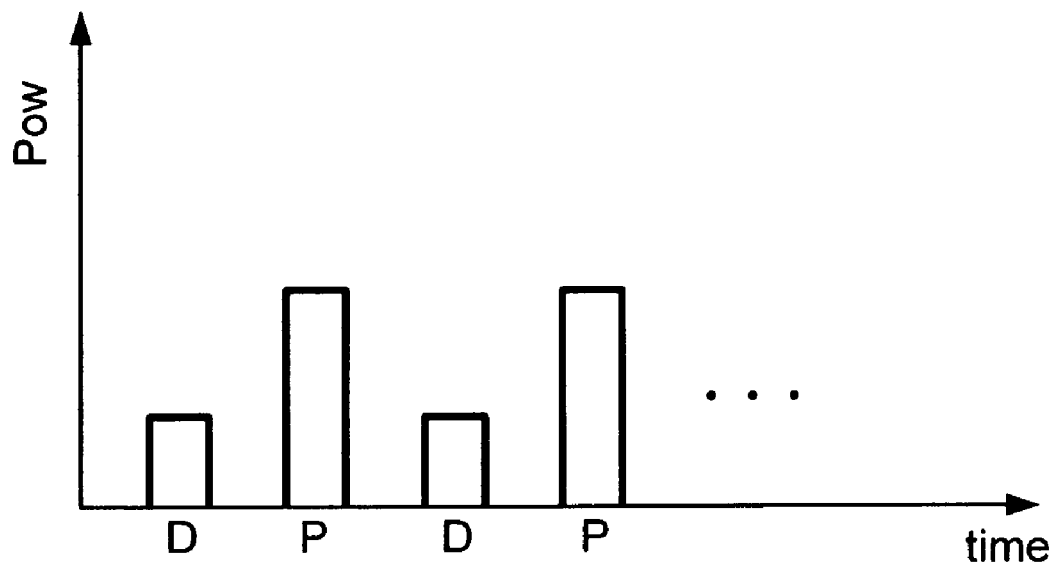
FIG. 32 shows, for the sixth embodiment, the switching of partition switches FPSW and APSW in the case of time-sharing between charge mode and communications mode.

Moreover, it is possible to perform time-division of charge mode and communications mode, by repeating the operation of switching over between P and D, by synchronizing partition switch APSW of electronic device APP with partition switch FPSW of tile carpet CPEn. FIG. 32 illustrates the switchover operation for partition switches FPSW and APSW in accordance with such a case. In FIG. 32, "D" denotes that all of partition switches FPSW and APSW are connected to D, and that the operation mode is communication mode. As well, "P" denotes that all of partition switches FPSW and APSW are connected to P, and that the operation mode is charge mode. Moreover, in FIG. 32, the horizontal axis represents time, and the vertical axis represents the field strength.

Figure 33:
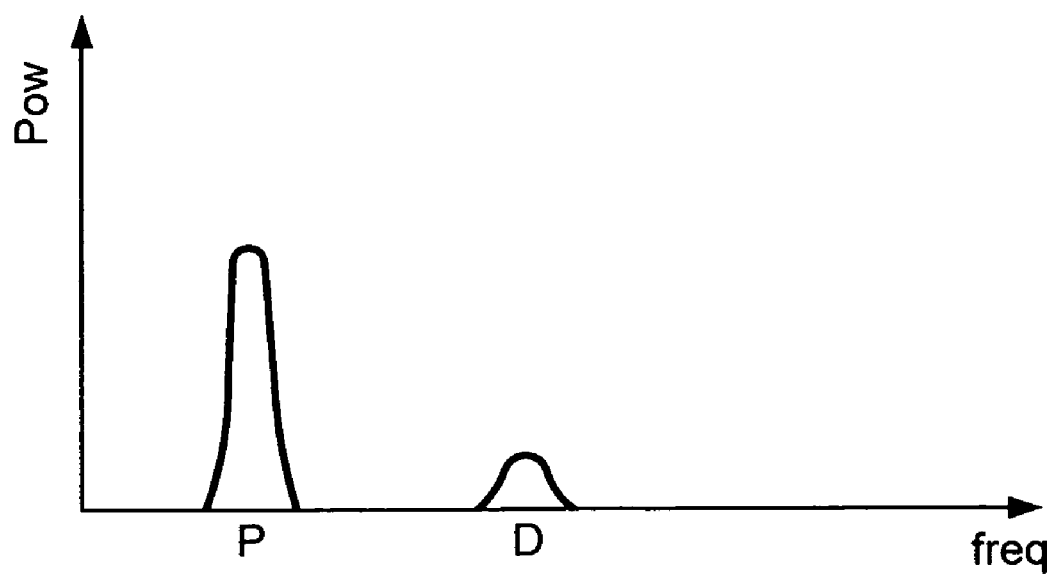
FIG. 33 shows a case where, in the sixth embodiment, the frequency P of the AC voltage for charging and the carrier frequency D of the carrier wave have been made to differ.

As well, as shown in FIG. 33, the difference of the frequency band P of the AC voltage used for charging and the frequency band D of the carrier wave used in communications means that it becomes possible to perform charge mode and communications mode simultaneously. In FIG. 33, the horizontal axis represents frequency, the vertical axis represents field strength. However, in this case, it is necessary to provide a circuit that applies signal voltage between main electrode FB and return electrodes WG by combining the AC voltage (frequency band P) used for charging provided from oscillator POSC and the AC voltage (frequency band D) used for communications provided from communications apparatus FTRX. As well, it is necessary to provide, instead of partition switch APSW, a circuit that isolate the component of AC voltage for communications and the component of AC voltage for charging from the AC voltage induced between main electrode AB and return electrode AG, that outputs to communications apparatus APPTRX the component of the AC voltage for communications, and that outputs to rectifier circuit BRG the components of the AC voltage for charging.

As well, in this case, it is preferable to provide a circuit that detects whether there is a carrier frequency component for communications or that for recharging, included in the AC voltage induced between main electrode AB and return electrode AG. Thus, electronic device APP can determine, for example, whether or not the location on which said electronic device has been put is the top of a tile carpet capable of recharging, or on top of a tile carpet capable of communication.

Moreover, when only the charging operation for electronic device APP is performed, a primary coil may substitute for return electrodes WG and main electrode FB, and a secondary coil may substitute main electrode AB and return electrode AG, in the configuration shown in FIG. 31. According to the modification, an AC voltage is also induced by the secondary coil by mutual induction. In this case, the primary coil is provided on the surface of the vicinity inside tile carpet CPEn, and the secondary coil is provided on the lower surface of the vicinity inside electronic device APP. As well, when putting electronic device APP on tile carpet CPEn for charging, in order to place the primary coil and the secondary coil in a precise location, it is preferable that lines for determining the charge space, or a mark for aligning the location is described on the surface of tile carpet CPEn.

Modifications of the Sixth Embodiment

<First Modification>

In the sixth embodiment, the communications controller apparatus CCUXn and communications apparatus FTRX involved in tile carpet CPEn and electronic device APP may perform the control described below. Communications controller apparatus CCUXn transmits periodically from communications apparatus FTRX a notification signal that notifies of the existence of communications controller apparatus CCUXn. Electronic device APP demodulates data transmitted from communications apparatus FTRX, based on measurement results of voltage differences between main electrode AB and return electrode AG. In a case that electronic device APP receives the notification signal continuously more than predetermined interval, electronic device APP displays on its screen a message or mark showing that it is in the communications area.

As well, if tile carpet CPEn is capable of charging electronic device APP, communications controller apparatus CCUXn periodically transmits from communications apparatus FTRX a charge notification signal notifying that it is able to charge using said tile carpet CPEn, in addition to said notification signal. In a case that electronic device APP receives the charge notification signal continuously more than predetermined interval, electronic device APP displays on its screen a message or mark showing that it is on tile carpet CPEn capable of recharging electric device APP.

Figure 34:
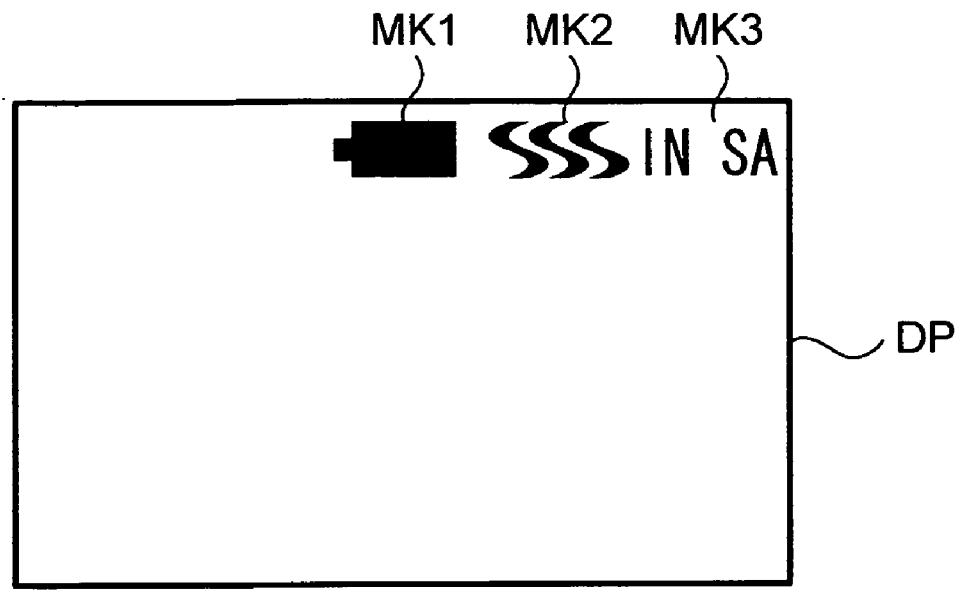
FIG. 34 shows an example of the screen of electronic device APP according to a modification of the sixth embodiment.
Figure 35:
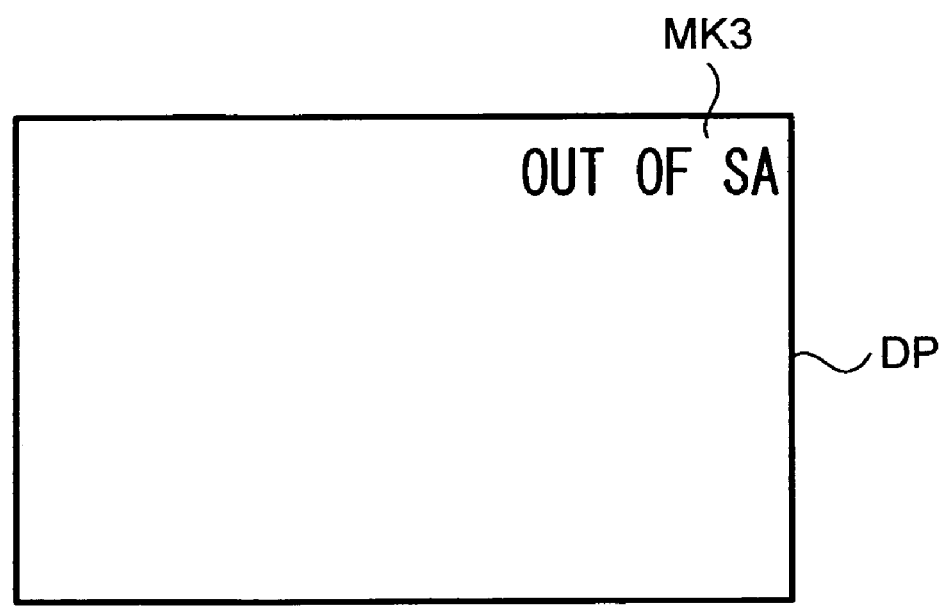
FIG. 35 shows another example of the screen of an electronic device APP according to a modification of the sixth embodiment.

FIG. 34 and FIG. 35 shows examples of image display for an electronic device APP according to the present modification. In the case that electronic device APP is on/over tile carpet tile carpet CPEn capable of charging, an electric field strength mark MK2 that indicates the electric field reception level by number of waves, and an area notification mark MK3 that indicates being inside the communications service area, are displayed in the display image DP, as shown in FIG. 34. In the case that electronic device APP is outside the communications area, only area notification mark MK3 indicating that it is outside the communication area, is displayed and charge mark MK1 and electric field strength mark MK2 are not displayed as shown in FIG. 35.

Of course, instead of the display image for charge mark MK1, electric field strength MK2 and area notification mark MK3, the notification may be performed using an audible message or the like. As well, it is possible to apply the modifications to communications apparatus HTRX worn on human body HP.

Although certain preferred embodiments of the present invention have been shown and described in detail, it should be understood that various changes and modifications may be made therein without departing from the scope of the invention.

What is claimed is:

1. A communications unit comprising:
   a first communications means that controls communications between said communications unit and one or a plurality of other communications units connected to said communications unit;
   a second communications means that controls communications between said communications unit and a client communications apparatus; and
   a plurality of connection parts for connecting to said one or a plurality of other communications units, said plurality of connection parts being provided on a surface of said communication unit, said surface touching at least one of said one or a plurality of other communications units;
   wherein:
   said communication unit is installed in a mapped unitary flooring of a construction or in a mapped unitary flooring, and said communication units and said one or a plurality of other communication units installed in said mapped unitary flooring are interconnected to form a communication network that serves said client communications apparatus;

each of said communications unit and said one or a plurality of other communications units have an identifier;

said communication unit further comprises an operation unit;

when said operation unit is operated, said first communications unit determines whether at least one of said one or a plurality of other communications units is connected to at least one of said plurality of connection parts; and when at least one of said plurality of said one or a plurality of said other communications units are determined to be connected to at least one of said plurality of connection parts, said communications unit communicates with said at least one of said plurality of other communications units, and acquires said identifier of said at least one of said plurality of other communications units.

2. A communication unit according to claim 1, wherein when said first communication means receives an instruction to update a connection state, said first communications unit determines whether at least one of said plurality of other communications units is connected to at least one of said plurality of connection parts.

3. A communication unit according to claim 1, wherein:

said client communications apparatus comprises a transmitter main electrode provided in a location so as to readily exert an electric effect on a dielectric; and a modulator that modulates an electric potential to said transmitter main electrode in response to an electric signal corresponding to transmitted data;

said client communications apparatus provides to said dielectric an electric field corresponding to the modulated electric potential;

said communications unit further comprises a receiver main electrode provided in a location so as to readily exert an electric effect on a dielectric; and said second communications means comprises a measuring part that measures an electric state of said receiver main electrode exerted by said electric field; and a demodulator that acquires said electric signal from said measuring part and acquires said transmitted data by demodulating said electric signal.

4. A communication unit according to claim 3, wherein said measuring part comprises:

an electro-optical crystal that exhibits a Pockels Effect and modulates light penetrating said electro-optical crystal in response to an electric field in the space where said electro-optical crystal is located;

light emitting means that emits light to said electro-optical crystal; and light receiving means that receives light penetrating said electro-optical crystal, and output signals in response to the received light.

5. A communications unit according to claim 1, wherein:

said client communications apparatus comprises:

a transmitter main electrode provided in a location that readily exerts an electric effect on a dielectric; a transmitter return electrode; and a modulator that changes the voltage difference between said transmitter main electrode and said transmitter return electrode in response to an electric signal corresponding to the transmitted data, said client communications apparatus provides to said dielectric an electric field corresponding to changes in the voltage generated by said modulator;

said communications unit further comprises:

a receiver main electrode provided in a location that readily exerts an electric effect on a dielectric, the location being in the surface of said communications unit; and a receiver return electrode connected to said communications unit to establish a return path with said transmitter feed back electrode; and said second communications means comprises:

a measuring part that measures the electric state generated between said receiver main electrode and said receiver return electrode by the electric field provided to said dielectric; and a demodulator that acquires said electric signal based on the measurement result from said measuring part, and acquires data transmitted from said client communications apparatus by demodulating said electric signal.

6. A communications unit according to claim 1, wherein:

said communications unit further comprises a transmitter return electrode provided in a location that readily exerts an electric effect on a dielectric, the location being in the surface of said communications unit;

said second communications means comprises:

signal generator that generates an electric signal corresponding to data to be transmitted; and a modulator that changes an electric potential provided to said transmitter main electrode in response to said electric signal, said second communications means provide to said dielectric an electric field corresponding to changes in the electric potential generated by said modulator; and said client communications apparatus comprises a receiver main electrode provided in a location where said receiver main electrode is readily subject to an electric effect by said dielectric;

a measuring part that measures the electric state generated at said receiver main electrode by the electric field provided to said dielectric; and a demodulator that acquires said electric signal based on the measurement result from said measuring part, and acquires data transmitted from said to said communications unit by demodulating said electric signal.

7. A communications unit according to claim 1, further comprising a transmitter return electrode provided in a location that readily exerts an electric effect on a dielectric, the location being in the surface of said communications unit, and a receiver return electrode connected to said communications unit, wherein said second communications means comprises signal generator that generates an electric signal corresponding to data to be transmitted, and a modulator that changes an electric potential provided to said transmitter main electrode in response to said electric signal, said second communications means provide to said dielectric an electric field corresponding to changes in the electric potential generated by said modulator, and said client communications apparatus comprises:

a receiver main electrode provided in a location where said receiver electrode is readily subject to an electric effect by said dielectric;

a receiver return electrode for establishing a return path with said transmitter return electrode;

measuring part that measures the electric state generated between said receiver main electrode and said receiver return electrode by the electric field provided to said dielectric; and a demodulator that acquires said electric signal based on the measurement result from said measuring part, and acquires data transmitted from said to said communications unit by demodulating said electric signal.

8. A communications unit according to claim 1, wherein:

said receiver main electrodes are severally provided on the surface of said communications unit;

said measuring part measures the strength of said electric field at each of said receiver main electrodes; and said communications unit further comprises:

storage means that store location information indicating the location where said communications unit is disposed; and location detection means that acquires locations of said client communications apparatus, based on the measurement result by said measuring part and information stored in said storage means.

9. A communications unit according to claim 8, wherein said client communications apparatus comprises two transmitter main electrodes on its lower surface;

said client communications apparatus can generate an electric field from one of said two transmitter main electrodes;

each of said receiver main electrodes are provided on the surface of said communications unit;

said measuring part measures at each said receiver main electrode the electric field generated from said transmitter main electrode;

said location detection means acquires the location of each of said transmitter main electrodes, based on the measurement result by said measurement part and information stored in said storage means.

10. A communications unit according to claim 1, further comprising:

a pair of first electrodes that are located in an interval, and a directional coupling element that connects said pair of first electrodes, the pair of first electrodes being provided on footwear on one foot or the other worn by a person who is on said communications unit;

a plurality of second electrodes provided on the surface of said communications unit;

storage means that store location information that indicates the locations of said plurality of second electrodes on the surface of said communications unit;

measuring means that consecutively select a pair of second electrodes from among said plurality of second electrodes, measures an electric potential induced at one of the selected pair of with the other of said pair of second electrodes being applied the change in electric potential; and direction detection means that acquires the direction of said person based on information recorded in said storage means and the measurement result by said measurement means.

11. A communications unit according to claim 1, further comprising:

a pair of first electrodes that are located in an interval, and a directional coupling element that connects said pair of first electrodes, the pair of first electrodes being provided on object located on said communications unit;

a plurality of second electrodes provided on the surface of said communications unit;

storage means that store location information that indicates the locations of said plurality of second electrodes on the surface of said communications unit;

measuring means that consecutively select a pair of second electrodes from among said plurality of second electrodes, measures an electric potential induced at one of the selected pair of with the other of said pair of second electrodes being applied the change in electric potential; and direction detection means that acquires the direction of said object based on information recorded in said storage means and the measurement result by said measurement means.

12. A communications unit according to claim 1, further comprising:

a pair of first electrodes that are located in an interval, and a directional coupling element that connects said pair of first electrodes, the pair of first electrodes being provided on footwear on one foot or the other worn by a person who is on said communications unit;

a plurality of second electrodes provided on the surface of said communications unit;

storage means that store location information that indicates the location of said communications unit and location information that indicates the locations of said plurality of second electrodes on the surface of said communications unit;

measuring means that consecutively select a pair of second electrodes from among said plurality of second electrodes, measures an electric potential induced at one of the selected pair of with the other of said pair of second electrodes being applied the change in electric potential; and direction detection means that acquires the direction of said person based on information recorded in said storage means and the measurement result by said measurement means.

13. A communications unit according to claim 1, further comprising:

a pair of first electrodes that are located in an interval, and a directional coupling element that connects said pair of first electrodes, the pair of first electrodes being provided on object located on said communications unit;

a plurality of second electrodes provided on the surface of said communications unit;

storage means that store location information that indicates the location of said communications unit and location information that indicates the locations of said plurality of second electrodes on the surface of said communications unit;

measuring means that consecutively select a pair of second electrodes from among said plurality of second electrodes, measures an electric potential induced at one of the selected pair of with the other of said pair of second electrodes being applied the change in electric potential; and direction detection means that acquires the direction of said object based on information recorded in said storage means and the measurement result by said measurement means.

14. A communications unit according to claim 1, wherein said client communications apparatus comprises:
a first electrode and a second electrode formed on a surface in contact with a face of said communications unit;
a rectifier circuit that converts to DC voltage the AC voltage induced between said first electrode and said second electrode; and
a battery that is charged by the DC voltage acquired by said rectifier circuit, and
said communications unit further comprises:
a third electrode formed on a surface of said communications unit, the surface contacting said client communications apparatus;
a fourth electrode connected to said communications unit for establishing a return path; and
an oscillator that applies, between said third electrode and said fourth electrode, an AC voltage for performing charging of said communications apparatus.

15. A communications unit according to claim 1, wherein said client communications apparatus comprises:
a secondary coil provided on a surface in contact with a face of said communications unit;
a rectifier circuit that converts to DC voltage the AC voltage induced at said secondary coil; and
a battery that is charged by the DC voltage acquired by said rectifier circuit, and
said communications unit further comprises:
a primary coil provided on a surface in contact with said client communications apparatus; and
an oscillator that applies to said primary coil an AC voltage for charging said client communications apparatus.

16. A management apparatus for managing communications network formed by a plurality of communications units, the communications units comprising:
a first communications means that controls communications between said communications unit and one or a plurality of other communications units connected to said communications unit; and
a second communications means that controls communications between said communications unit and a client communications apparatus,
wherein said communication unit is installed in a mapped unitary flooring of a construction or in a mapped unitary flooring, and said communication units and said one or a plurality of other communication units installed in said mapped unitary flooring are interconnected to form a communication network that serves said client communications apparatus; and
said management apparatus comprising:
detection means that detect the network topology of said communications network; and
notification means that notify the user of said management apparatus of information indicating the connection status of said plurality of communications units, based on the network topology detected by said detection means.

17. A management apparatus according to claim 16, wherein
said detection means detects the network topology of said communications network, in the case where new communications unit is added to said communications network and at least one of said plurality of communications units is removed.

18. A management apparatus according to claim 16, wherein
each of said plurality of communications unit is located so as to adjoin at least one of other communications unit,
said management apparatus further comprises acquisition means that acquire information indicating the size, the form, and connection locations of said plurality of communications units,
said notification means notify the user of said management apparatus of information indicating the location states of said plurality of communications unit, based on the network topology detected by said detection means and information acquired by said acquisition means.

19. A management apparatus for managing communications network formed by a plurality of communications unit, the communications units comprising:
a first communications means that controls communications between said communications unit and one or a plurality of other communications units connected to said communications unit; and
a second communications means that controls communications between said communications unit and a client communications apparatus,
wherein said communication unit is installed in a mapped unitary flooring of a construction or in a mapped unitary flooring, and said communication units and said one or a plurality of other communication units installed in said mapped unitary flooring are interconnected to form a communication network that serves said client communications apparatus; and
said management apparatus comprising:
storage means that store reference point information showing a location of reference point for computing the location of said plurality of communications units;
detection means that detect the network topology of said communications network;
acquisition means that acquire information indicating the size, the form, and connection locations of said plurality of communications units;
location detection means that acquire the locations of at least one of said plurality of communications units, based on reference point information stored in said storage means, the network topology detected by said detection means, and information acquired by said acquisition means; and
transmission means that transmit to said communications unit location information acquired by said location detection means.

* * * * *